(12) United States Patent
Shimizu et al.

(10) Patent No.: US 10,616,140 B2
(45) Date of Patent: Apr. 7, 2020

(54) INFORMATION PROCESSING SYSTEM AND INFORMATION PROCESSING METHOD

(71) Applicant: FUJITSU LIMITED, Kawasaki-shi, Kanagawa (JP)

(72) Inventors: Toshihiro Shimizu, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/010,552

(22) Filed: Jun. 18, 2018

(65) Prior Publication Data

US 2018/0375798 A1    Dec. 27, 2018

(30) Foreign Application Priority Data

Jun. 27, 2017   (JP) .................................. 2017-125354

(51) Int. Cl.
*H04L 12/00*    (2006.01)
*H04L 12/933*   (2013.01)

(52) U.S. Cl.
CPC ................................ *H04L 49/1584* (2013.01)

(58) Field of Classification Search
CPC . H04L 49/1584; H04L 12/6418; H04L 47/60; H04L 65/4076
See application file for complete search history.

(56) References Cited

U.S. PATENT DOCUMENTS

| | | | |
|---|---|---|---|
| 8,370,496 B1* | 2/2013 | Marr | H04L 67/1031 370/396 |
| 2003/0046512 A1 | 3/2003 | Ioki et al. | |
| 2014/0169158 A1* | 6/2014 | Mishra | H04L 69/04 370/228 |
| 2015/0334035 A1 | 11/2015 | Miwa et al. | |
| 2018/0176152 A1* | 6/2018 | Song | H04L 45/48 |
| 2018/0205624 A1* | 7/2018 | Rai | H04L 43/0852 |

FOREIGN PATENT DOCUMENTS

| | | |
|---|---|---|
| JP | 7-262155 | 10/1995 |
| JP | 2003-67354 | 3/2003 |
| JP | 2015-232874 | 12/2015 |

* cited by examiner

*Primary Examiner* — Phuc H Tran
(74) *Attorney, Agent, or Firm* — Fujitsu Patent Center

(57) ABSTRACT

An information processing system includes a plurality of switches connected to each other in a form of a full mesh and a plurality of information processing apparatuses respectively connected to any one of the plurality of switches. A first information processing apparatus of the plurality of information processing apparatuses includes a processor. The processor is configured to generate a second identifier by calculating an exclusive OR of a first identifier and a first number corresponding to a communication phase. The first identifier identifies a first switch connected to the first information processing apparatus. The first number is included in a set of linearly independent numbers allocated to the first information processing apparatus. The processor is configured to perform communication with a second information processing apparatus of the plurality of information processing apparatuses. The second information processing apparatus is connected to a second switch having the second identifier.

6 Claims, 42 Drawing Sheets

FIG. 18

| PHASE NUMBER | COMMUNICATION 1 | COMMUNICATION 2 | ... |
|---|---|---|---|
| 0 | (N4,N5) |  | ... |
| 1 | (N1,N2) | (N3,N4) | ... |
| 2 | (N1,N3) | (N2,N4) | ... |
| 3 | N4 -> N5 |  | ... |

FIG. 20

| $a_{ij}$ | | j | | |
|---|---|---|---|---|
| | | 0 | 1 | 2 |
| i | 0 | 01 | 11 | 10 |
| | 1 | 11 | 10 | 01 |

FIG. 37

| $a_{ij}$ | | j | | | | | | |
|---|---|---|---|---|---|---|---|---|
| | | 0 | 1 | 2 | 3 | 4 | 5 | 6 |
| i | 0 | 001 | 011 | 110 | 010 | 101 | 100 | 111 |
| | 1 | 011 | 110 | 010 | 101 | 100 | 111 | 001 |
| | 2 | 110 | 010 | 101 | 100 | 111 | 001 | 011 |

FIG. 38

```
B:={BIT COLUNM OF k ROW TO BE TARGE},
a=0
function f()
   if B IS BLANK
   OUTPUT a THEN END
   foreach ORIGINAL e OF B
   REMOVE e FROM B
   ADD e TO LAST PORTION OF a
   if LAST k ROW OF a IS FIRST ORDINARY
INDEPENDNT
    f()
   REMOVE e FROM LAST PORTION OF a
   ADD e TO B
EXECUTE f()
```

INFORMATION PROCESSING SYSTEM AND INFORMATION PROCESSING METHOD

CROSS-REFERENCE TO RELATED APPLICATION

This application is based upon and claims the benefit of priority of the prior Japanese Patent Application No. 2017-125354, filed on Jun. 27, 2017, the entire contents of which are incorporated herein by reference.

FIELD

The embodiments discussed herein are related to an information processing system and an information processing method.

BACKGROUND

The throughput of a parallel distribution processing executed by parallel computer may be enhanced by improving the communication efficiency in the parallel computer through an optimization of a connection form of a server and a switch (i.e., network topology) in the parallel computer. In addition, when a large number of servers are connected with a small number of switches by an optimization of the network topology in the parallel computer, the construction cost of the parallel computer may be suppressed.

A network topology where each node in a network is directly connected to any of the other nodes is called a full mesh topology. A system adopting a structure in which each switch is directly connected to each of other switches (hereinafter, referred to as a full mesh system) is known. Further, a system in which a plurality of full mesh systems is connected by a spine switch is known. According to the technique, it is possible to avoid a route contention at the time of an all-to-all communication in the full mesh system. Here, the route contention indicates that a plurality of packets is transmitted simultaneously in the same direction of one route.

However, in the parallel computer, depending on a type of a job, a communication other than the all-to-all communication may be performed. As for the communication other than the all-to-all communication, for example, an all-reduce communication is known. The all-reduce communication refers to a communication in which all target nodes hold the result of an operation executed using data possessed by all of the target nodes, and the name of "all-reduce" refers to an operation thereof. Since the technique described above is directed to the all-to-all communication, the route contention may not be avoided at the time of executing the all-reduce communication.

Related technologies are disclosed in, for example, Japanese Patent Laid-Open Publication No. 2015-232874.

SUMMARY

According to an aspect of the present invention, provide is an information processing system including a plurality of switches connected to each other in a form of a full mesh and a plurality of information processing apparatuses respectively connected to any one of the plurality of switches. A first information processing apparatus of the plurality of information processing apparatuses includes a processor. The processor is configured to generate a second identifier by calculating an exclusive OR of a first identifier and a first number corresponding to a communication phase. The first identifier identifies a first switch connected to the first information processing apparatus. The first number is included in a set of linearly independent numbers allocated to the first information processing apparatus. The processor is configured to perform communication with a second information processing apparatus of the plurality of information processing apparatuses. The second information processing apparatus is connected to a second switch having the second identifier.

The object and advantages of the disclosure will be realized and attained by means of the elements and combinations particularly pointed out in the claims. It is to be understood that both the foregoing general description and the following detailed description are exemplary and explanatory and are not restirctive of the disclosure, as claimed.

BRIEF DESCRIPTION OF DRAWINGS

FIG. 18 is a diagram illustrating an example of a first communication table;

FIG. 20 is a diagram illustrating an example of a second communication table;

FIG. 37 is a diagram illustrating an example of a second communication table according to the third embodiment;

FIG. 38 is a diagram illustrating an example of a greedy algorithm;

DESCRIPTION OF EMBODIMENTS

Figure 1:
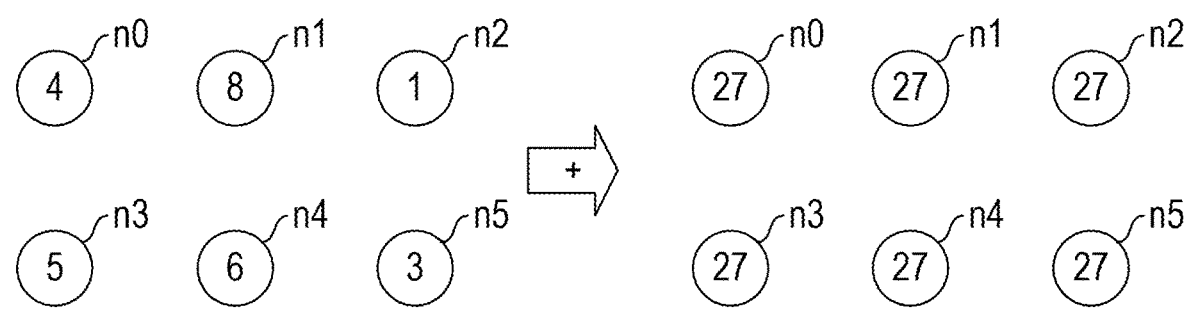
FIG. 1 is a diagram for describing an all-reduce communication.

FIGS. 1 to 4 are diagrams for describing the all-reduce communication. In FIG. 1, a server n0 has a value of "4," a server n1 has a value of "8," a server n2 has a value of "1," a server n3 has a value of "5," a server n4 has a value of "6," and a server n5 has a value of "3." In a case where an operation specified in the all-reduce is "addition," each of the servers n0 to n5 has a value of "27."

Figure 2A:
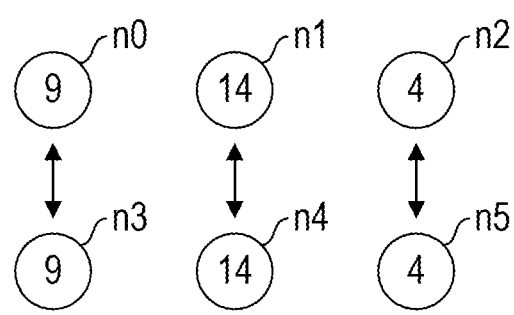
FIGS. 2A and 2B are diagrams for describing the all-reduce communication.

The all-reduce communication for implementing the state illustrated on the right side of FIG. 1 is performed as illustrated in, for example, FIGS. 2A, 2B, 3A, and 3B. First, as illustrated in FIG. 2A, the servers n0 and n3 share the values so that a value of "9" is calculated by the addition, the servers n1 and n4 share the values so that a value of "14" is calculated by the addition, and the servers n2 and n5 share the values so that a value of "4" is calculated by the addition.

Figure 2B:
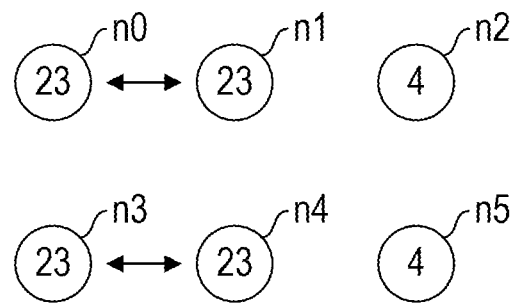

Then, as illustrated in FIG. 2B, the servers n0 and n1 share the values so that a value of "23" is calculated by the addition, and the servers n3 and n4 share the values so that a value of "23" is calculated by the addition.

Figure 3A:
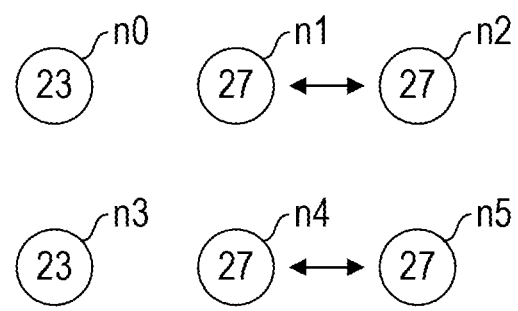
FIGS. 3A and 3B are diagrams for describing the all-reduce communication.

Then, as illustrated in FIG. 3A, the servers n1 and n2 share the values so that a value of "27" is calculated by the addition, and the servers n4 and n5 share the values so that a value of "27" is calculated by the addition.

Figure 3B:
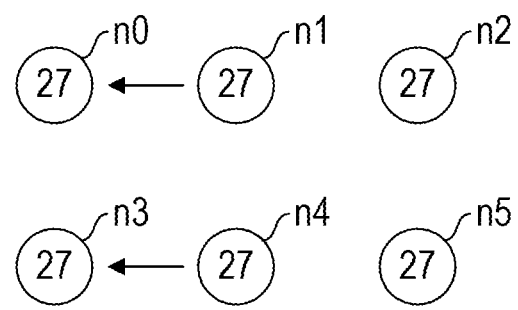

Finally, as illustrated in FIG. 3B, the server n1 transmits the value of "27" to the server n0, and the server n4 transmits the value of "27" to the server n3. As a result, as illustrated in FIG. 3B, each of the servers n0 to n5 may have the value of "27."

Figure 4A:
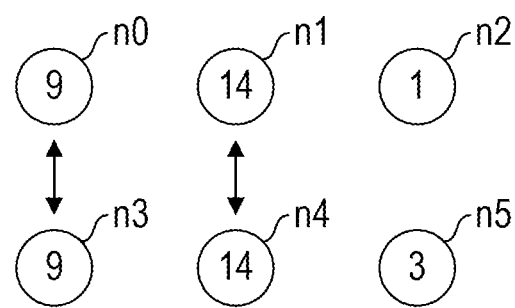
FIGS. 4A and 4B are diagrams for describing the all-reduce communication.

Here, the targets may not be all of the servers n0 to n5, but may be some of the servers n0 to n5. As an example, the all-reduce communication in a case where the targets are the servers n0, n1, n3, and n4 will be described. First, as illustrated in FIG. 4A, the servers n0 and n3 share the values so that a value of "9" is calculated by the addition, and the servers n1 and n4 share the values so that a value of "14" is calculated by the addition.

Figure 4B:
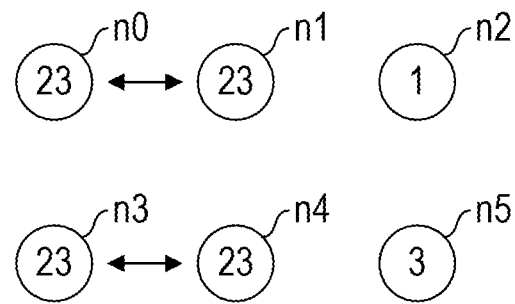

Then, as illustrated in FIG. 4B, the servers n0 and n1 share the values so that a value of "23" is calculated by the addition, and the servers n3 and n4 share the values so that a value of "23" is calculated by the addition. As a result, each of the servers n0, n1, n3, and n4 may have the value of "23."

Figure 5:
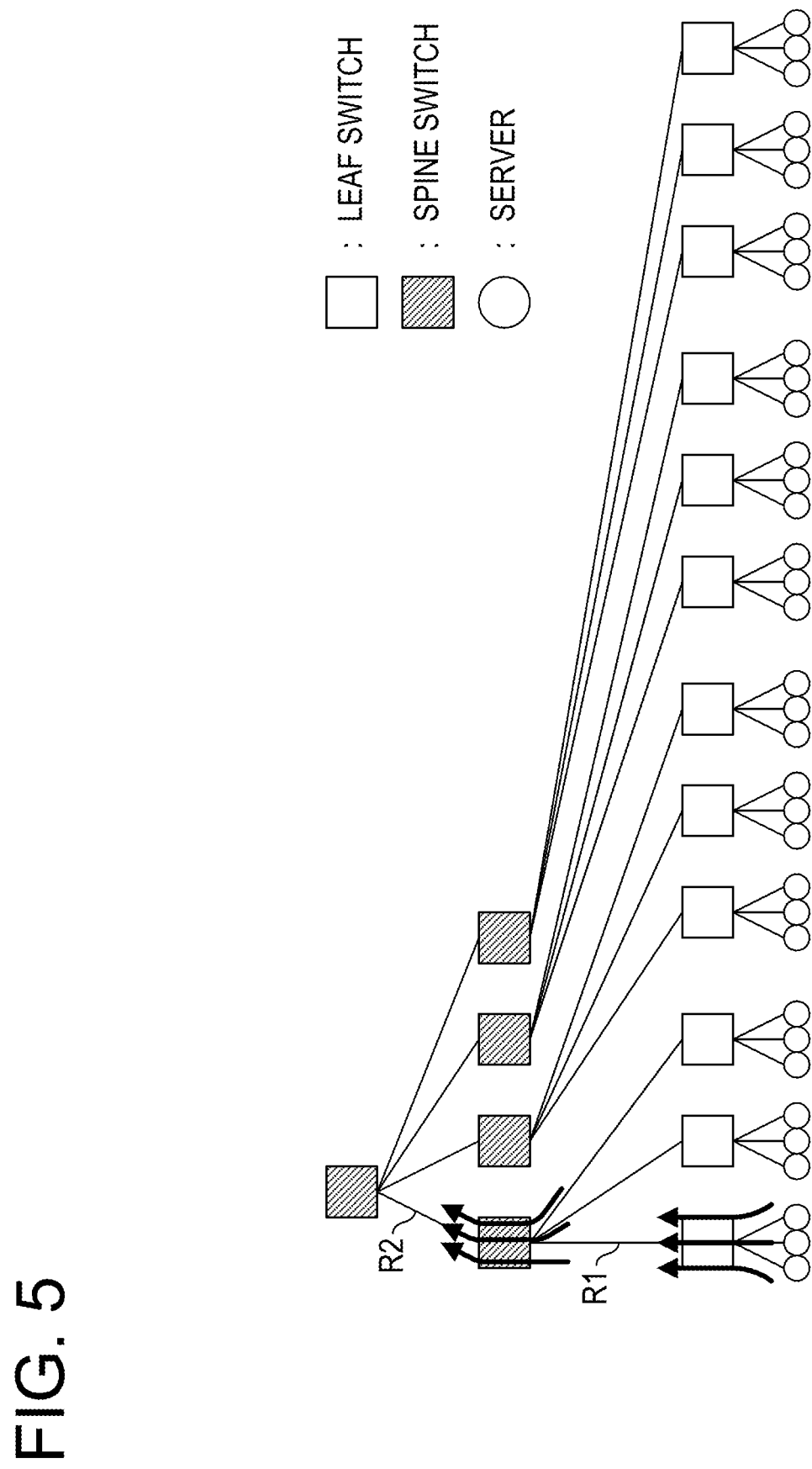
FIG. 5 is a diagram illustrating a route contention when the all-reduce communication is executed in a topology having a general tree structure.
Figure 6:
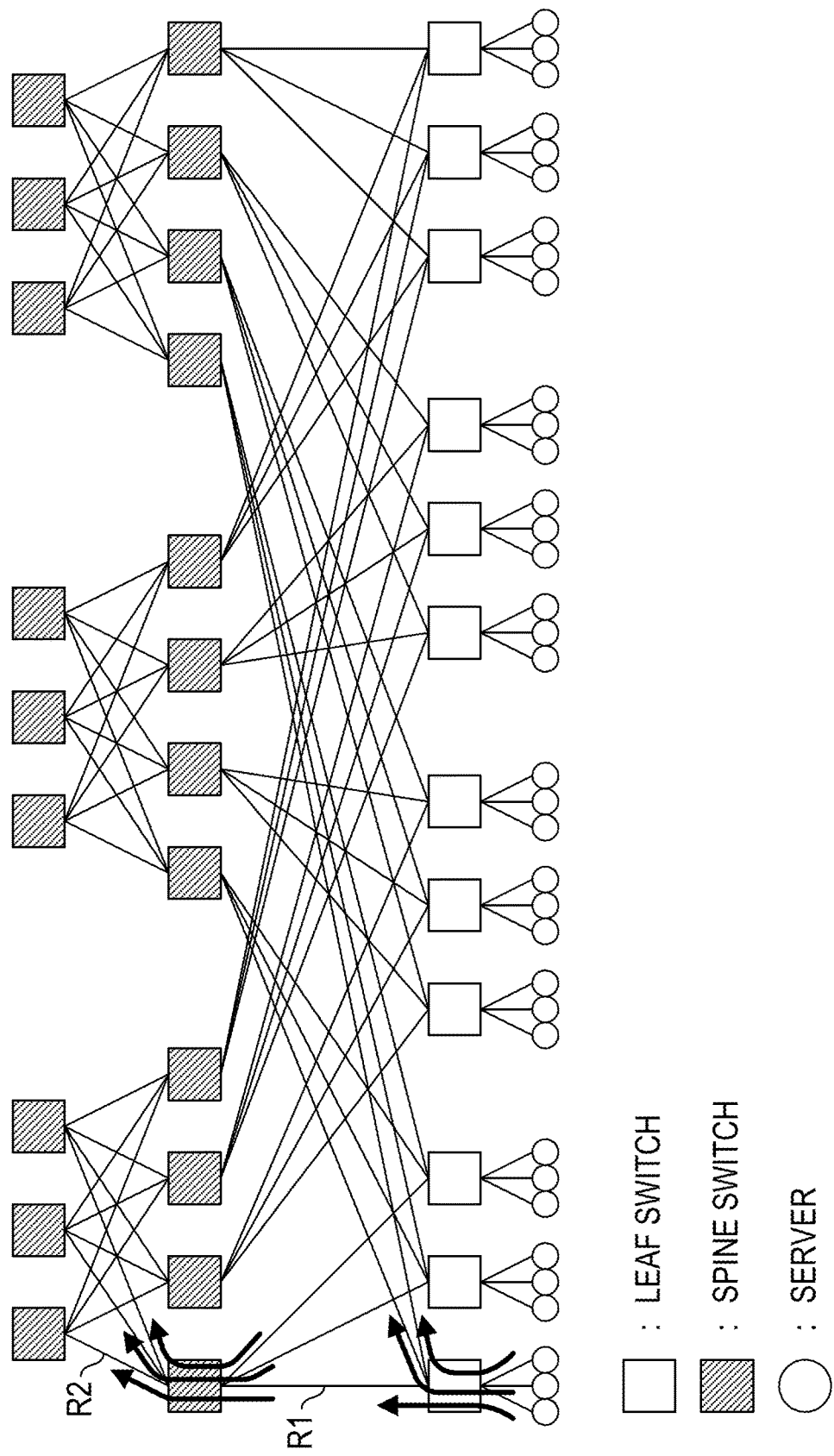
FIG. 6 is a diagram illustrating a route contention when the all-reduce communication is executed in a topology having a fat tree structure.

In a first embodiment, it is considered that a route contention is avoided when such all-reduce communication is executed by a single-layer full mesh system. As described above, the route contention indicates that a plurality of packets is simultaneously transmitted in the same direction of one route, and a communication time becomes longer due to an occurrence of the route contention. For example, FIG. 5 illustrates a route contention when the all-reduce communication is executed in a network topology having a general tree structure. In FIG. 5, a circled figure represents a server, a non-hatched square figure represents a leaf switch, and a hatched square figure represents a spine switch. In FIG. 5, the route contention occurs in a route R1 and the route contention also occurs in a route R2. In this case, for example, as illustrated in FIG. 6, the route contention may be avoided by changing the tree structure to a fat tree structure. However, when the fat tree structure is adopted, the total number of switches becomes larger than that in the example of FIG. 5.

Figure 7:
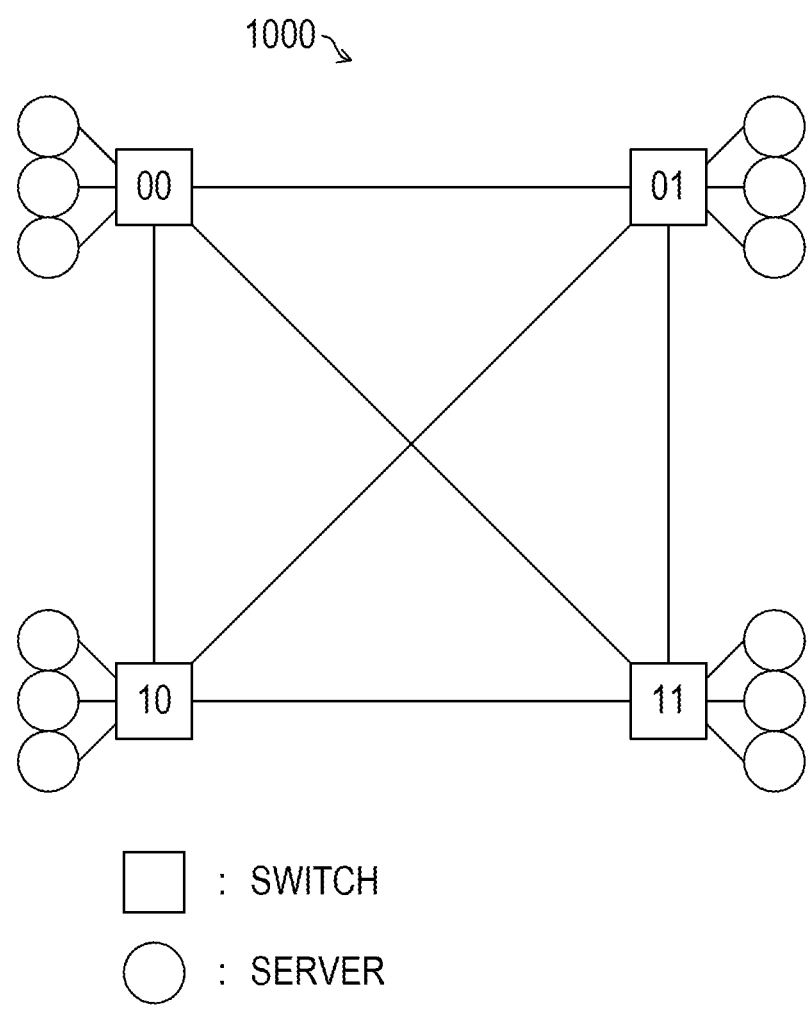
FIG. 7 is a diagram illustrating a single-layer full mesh system according to a first embodiment.

FIG. 7 is a diagram illustrating a single-layer full mesh system 1000 according to the first embodiment. According to the single-layer full mesh system 1000 of the present embodiment, four switches which are, for example, infiniband switches are connected to each other in a full-mesh topology. Each switch has an identifier "s" which is a two-digit bit string, and the identifier "s" of each switch is different from any of the identifiers "s" of the other switches. Specifically, there exist switches 00, 01, 10, and 11.

The switch 00 is directly connected to the switches 01, 10, and 11. The switch 01 is directly connected to the switches 00, 10, and 11. The switch 10 is directly connected to the switches 00, 01, and 11. The switch 11 is directly connected to the switches 00, 01, and 10.

In the example of FIG. 7, the polygonal topology having four corners is formed by the four switches. However, the present embodiment is applicable when the number of the switches is $2^k$ (k is a natural number of 2 or more) and a polygonal topology having $2^k$ corners is formed by the switches.

A number of ($2^k-1$) servers are connected to each switch. In the example of FIG. 7, since k=2, 3 (=$2^2-1$) servers are connected to each switch. Each server in the single-layer full mesh system 1000 is an information processing apparatus that performs a communication using a communication library such as a message passing interface (MPI). A parallel calculation is implemented by the 12 servers of the single-layer full mesh system 1000. Hereinafter, the number of the servers connected to each switch is set to "d." In the example of FIG. 7, d=3.

Figure 8:
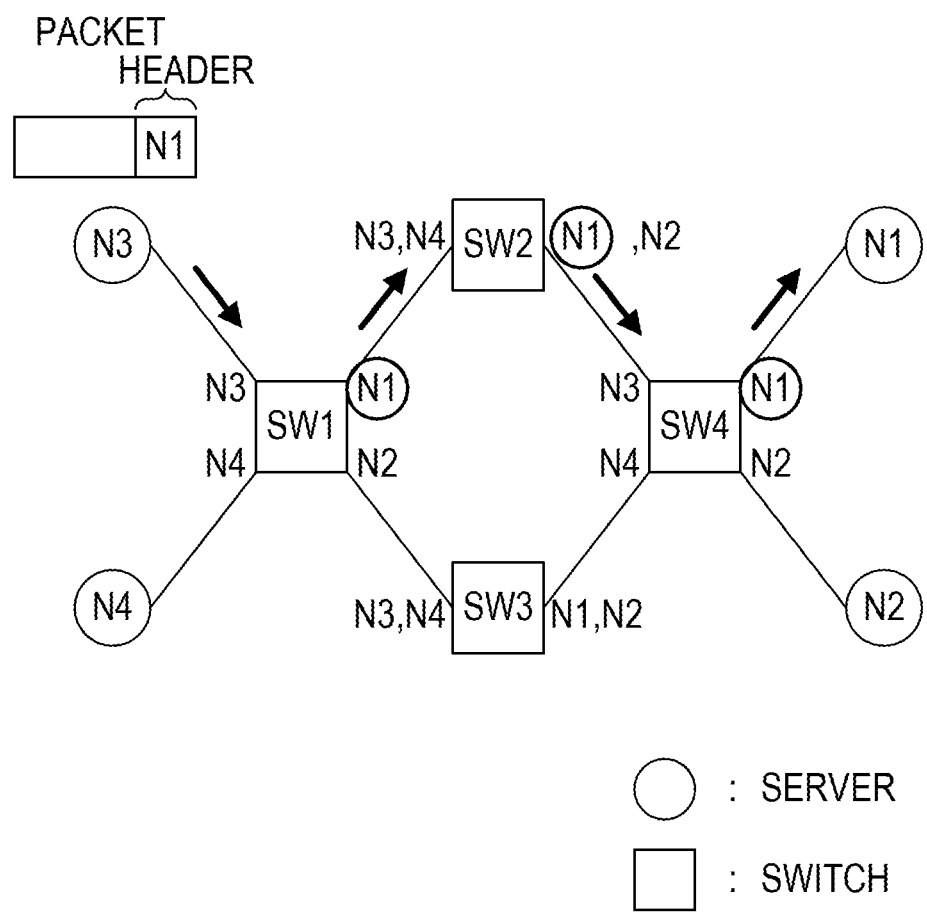
FIG. 8 is a diagram for describing routing in a network of an infini-band.

In the present embodiment, in order to avoid the route contention, an infini-band network in which a regular and fixed routing is performed is used. The routing in the infini-band network will be described with reference to FIG. 8. In FIG. 8, a circled figure represents a server, and a square figure represents a switch. A line segment represents a link of the infini-band, and a character string next to the line segment represents identification information of a server at a receiving destination. A thick-solid arrow represents a communication route.

In the example of FIG. 8, the server N3 transmits a packet whose receiving destination is the server N1. The header of the packet includes identification information (e.g., local identifier (LID)) of the receiving destination. Since each output port of each switch is associated with identification information of a server which is a receiving destination, each switch outputs the packet to the output port associated with the identification information of the receiving destination included in the packet. In the example of FIG. 8, the packet reaches the server N1 via switches SW1, SW2, and SW4.

That is, the network of the present embodiment is not a network in which the route is automatically determined like Ethernet (registered trademark), but a network in which the regular and fixed routing is performed.

Apart from the identification information, it is assumed that a number is allocated to each server. Specifically, any one number of 0 to 2 is allocated to each of the three servers under the control of each switch, and the server allocated with "0," the server allocated with "1," and the server allocated with "2" are connected to each switch. The numbers are used to specify a communication destination in the all-reduce.

Figure 9:
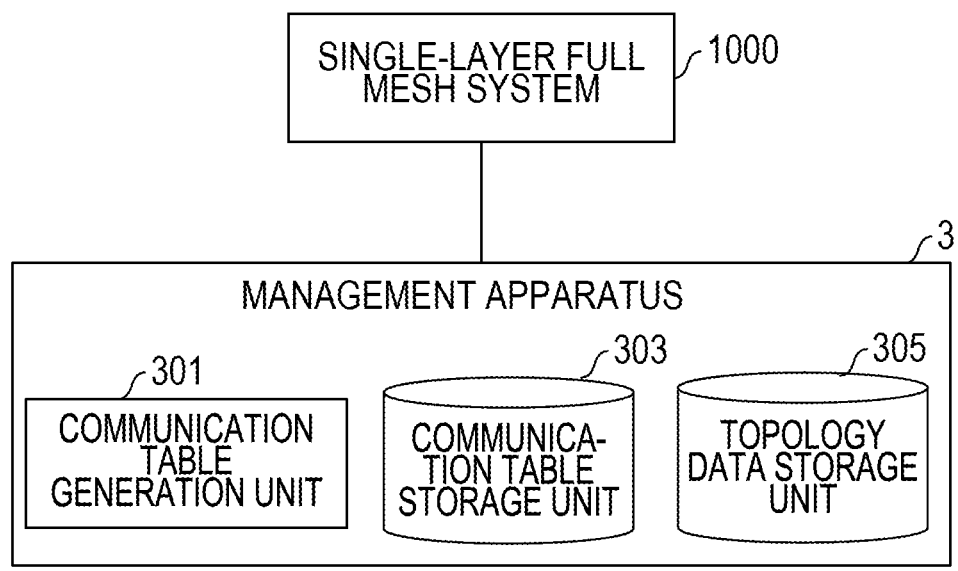
FIG. 9 is a functional block diagram of a management apparatus according to the first embodiment.

As illustrated in FIG. 9, the single-layer full mesh system 1000 is connected to the management apparatus 3 through, for example, a management local area network (LAN), and the communication in the single-layer full mesh system 1000 is managed by the management apparatus 3. The management apparatus 3 includes a communication table generation unit 301, a communication table storage unit 303, and a topology data storage unit 305. The communication table generation unit 301 is implemented by, for example, executing a program loaded in a memory 2501 in FIG. 39 by a central processing unit (CPU) 2503. The communication table storage unit 303 and the topology data storage unit 305 are installed in, for example, the memory 2501 or a hard disk drive (HDD) 2505 in FIG. 39.

The communication table generation unit 301 generates first and second communication tables based on the information of the network topology of the single-layer full mesh system 1000 stored in the topology data storage unit 305, and stores the generated first and second communication tables in the communication table storage unit 303. The communication table generation unit 301 transmits the first and second communication tables stored in the communication table storage unit 303 to each server in the single-layer full mesh system 1000 at a predetermined timing or according to a request.

Figure 10:
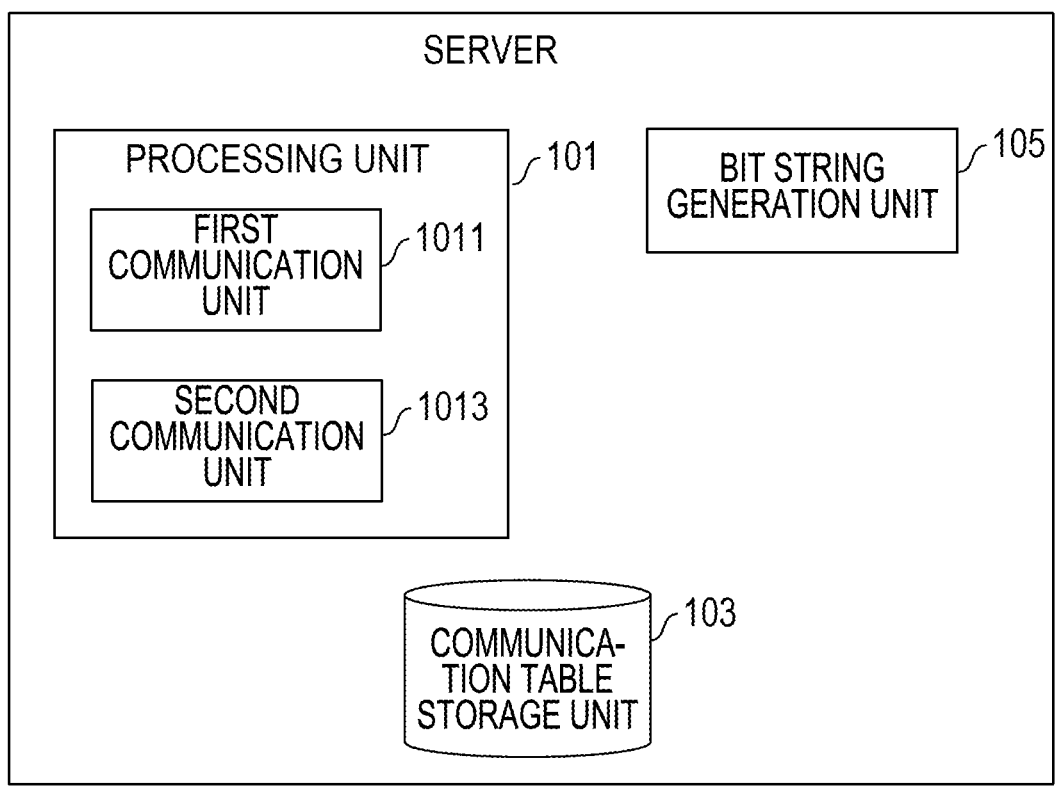
FIG. 10 is a functional block diagram of a server according to the first embodiment.

FIG. 10 is a functional block diagram of a server. The server includes a processing unit 101, a communication table storage unit 103, and a bit string generation unit 105. The processing unit 101 includes a first communication unit 1011 and a second communication unit 1013. The processing unit 101 and the bit string generation unit 105 are implemented by, for example, executing a program loaded to the memory 2501 in FIG. 39 by the CPU 2503. The communication table storage unit 103 is installed in, for example, the memory 2501 or the HDD 2505 in FIG. 39.

The communication table storage unit 103 stores the first and second communication tables received from the management apparatus 3. The bit string generation unit 105 generates a bit string based on the second communication table stored in the communication table storage unit 103. The first communication unit 1011 in the processing unit 101 performs a communication according to the first communication table stored in the communication table storage unit 103. The second communication unit 1013 in the processing unit 101 performs a communication based on the bit string generated by the bit string generation unit 105.

Next, with reference to FIGS. 11 to 22, the processing executed by the management apparatus 3 will be described.

Figure 11:
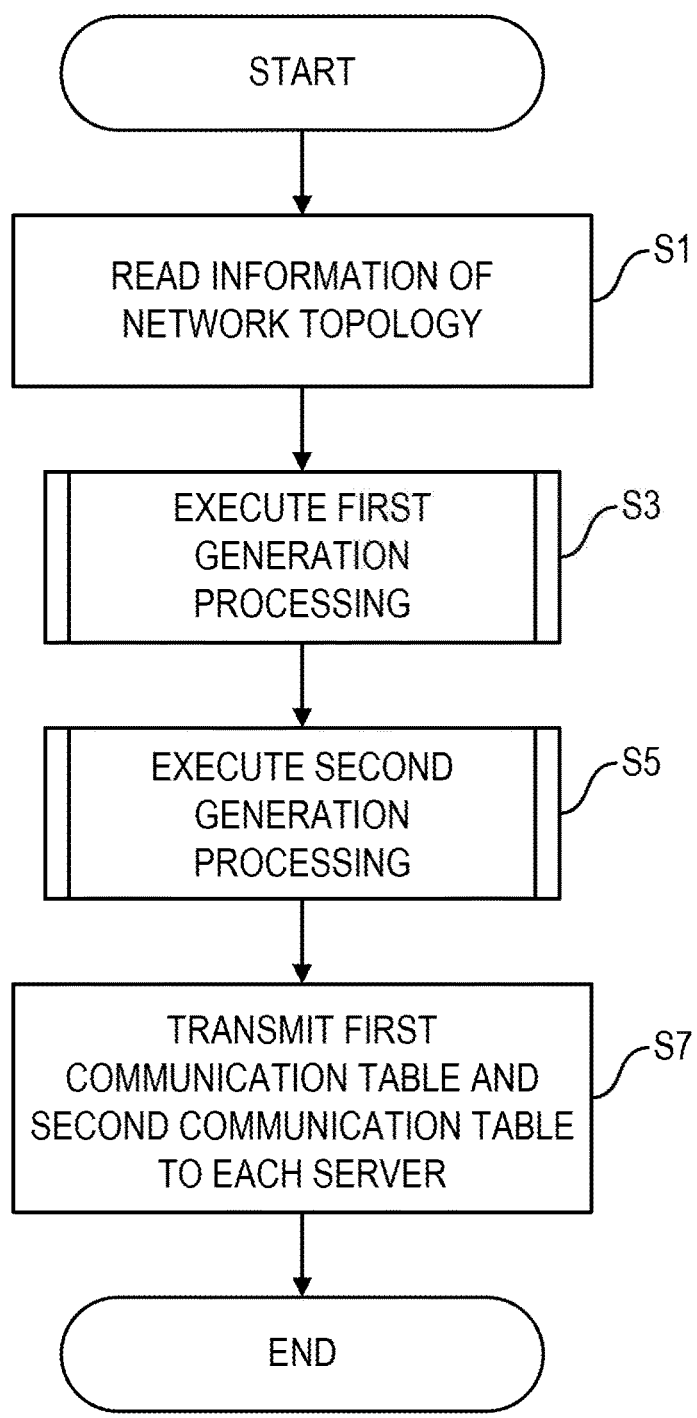
FIG. 11 is a diagram illustrating a processing flow of a processing executed by the management apparatus according to the first embodiment.

FIG. 11 is a diagram illustrating a processing flow of the processing executed by the management apparatus 3.

The communication table generation unit 301 in the management apparatus 3 reads the information on the network topology of the single-layer full mesh system 1000 from the topology data storage unit 305 (FIG. 11: step S1). The information of the network topology includes, for example, information on the connection relationship among the switches and the servers.

The communication table generation unit 301 executes a first generation processing which is a processing of generating the first communication table, based on the information of the network topology, which is read in step S1 (step S3).

Figure 12:
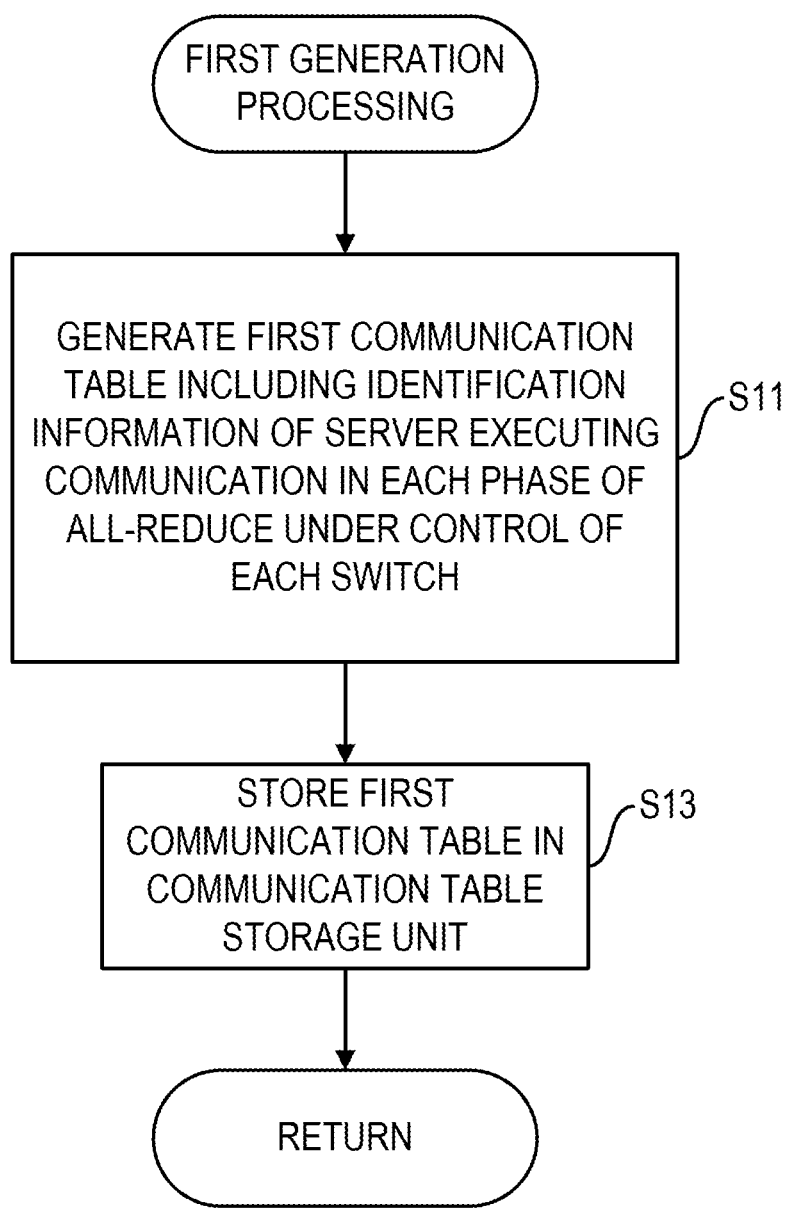
FIG. 12 is a diagram illustrating a processing flow of a first generation processing.

Next, with reference to FIGS. 12 to 18, the first generation processing will be described. FIG. 12 is a diagram illustrating the processing flow of the first generation processing.

The communication table generation unit 301 generates the first communication table including identification information of a server that executes a communication in each phase of the all-reduce under the control of each switch in the single-layer full mesh system 1000 (FIG. 12: step S11).

FIGS. 13A and 13B to 17 are diagrams for describing the all-reduce between servers under the control of each switch in the single-layer full mesh system 1000. In FIGS. 13A and 13B to 17, a square figure represents a switch, a circled figure represents a server, and a line segment connecting a switch and a server to each other represents a link. A number attached to a server represents a value held by the server.

First, with reference to FIGS. 13A and 13B and 14, a case where the number of servers under the control of the switch is an even number (here, 4 which is a power of 2) will be described.

Figure 13A:
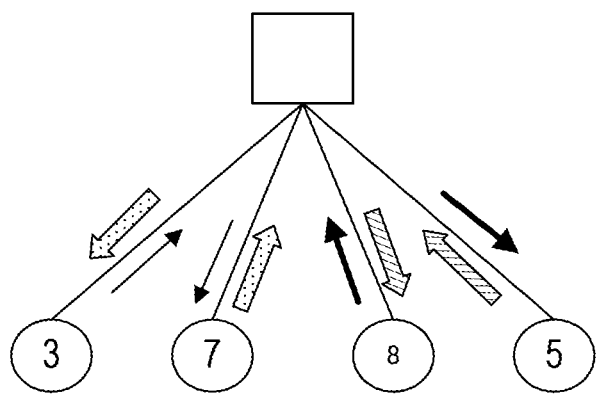
FIGS. 13A and 13B are diagrams for describing all-reduce between servers under a control of a switch.

For example, it is assumed that four servers have "3," "7," "8," and "5," respectively, as illustrated in FIG. 13A. In this case, the servers in each pair including two servers share the values so that the operation (here, addition) of the values is performed. Here, since the plurality of packets is not simultaneously transmitted in the same direction of one route, the route contention does not occur.

Figure 13B:
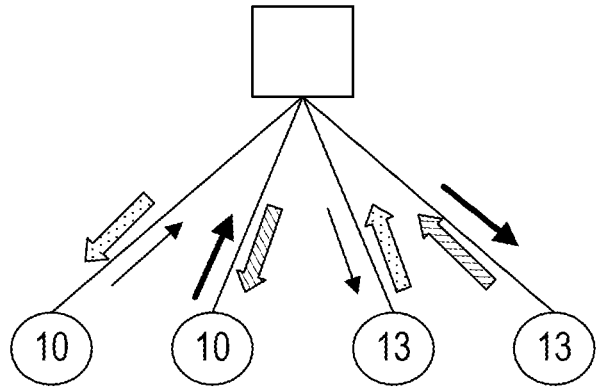

Then, each of the two servers has a value of "10," and each of the two remaining servers has a value of "13" as illustrated in FIG. 13B. Then, the servers in each pair including the servers having the values of "10" and "13,"

respectively, share the values so that the operation (here, addition) of the values is performed. Here, since the plurality of packets is not simultaneously transmitted in the same direction of one route, the route contention does not occur.

Figure 14:
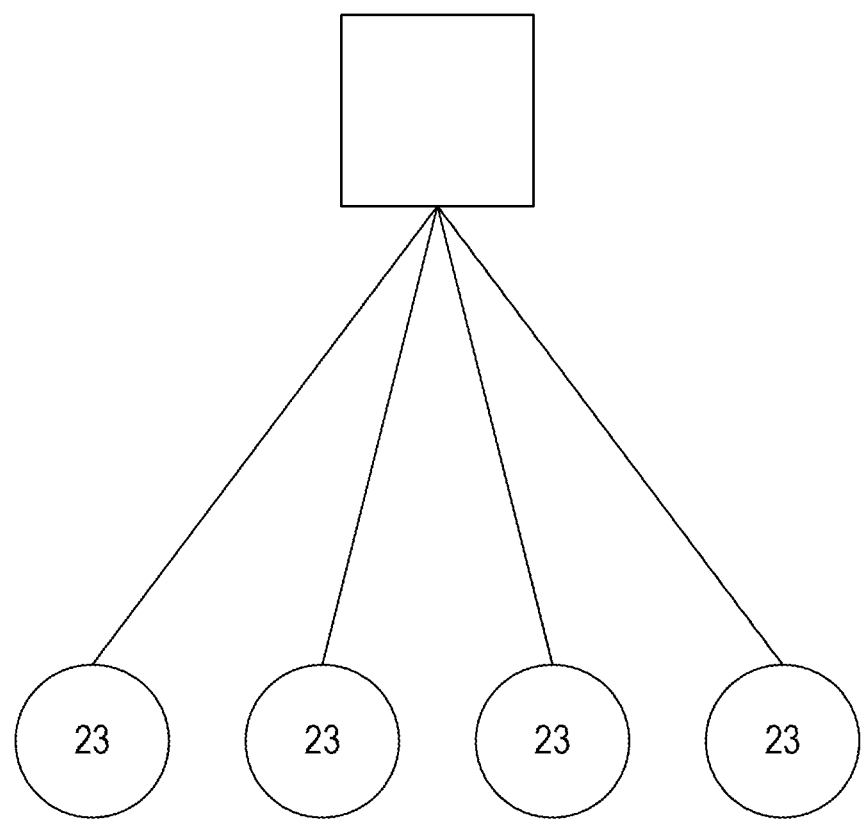
FIG. 14 is a diagram for describing the all-reduce between the servers under the control of the switch.

Accordingly, finally, each server has the value of "23" as illustrated in FIG. 14.

Next, with reference to FIGS. 15A and 15B to 17, a case where the number of servers under the control of the switch is an odd number (herein, 5) will be described.

Figure 15A:
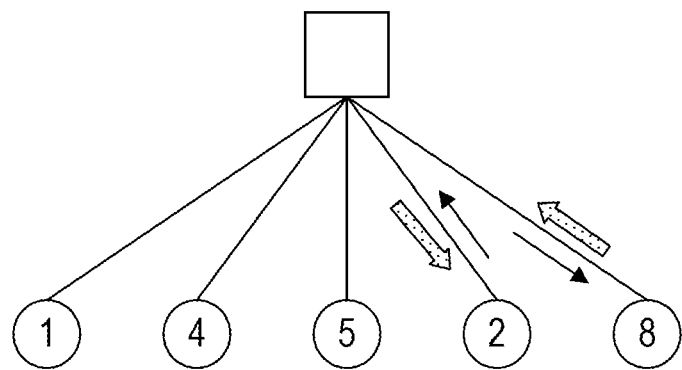
FIGS. 15A and 15B are diagrams for describing the all-reduce between the servers under the control of the switch.

For example, it is assumed that five servers have "1," "4," "5," "2," and "8," respectively, as illustrated in FIG. 15A. In this case, two of the five servers share the values so that the operation (here, addition) of the values is performed. Here, since the plurality of packets is not simultaneously transmitted in the same direction of one route, the route contention does not occur.

Figure 15B:
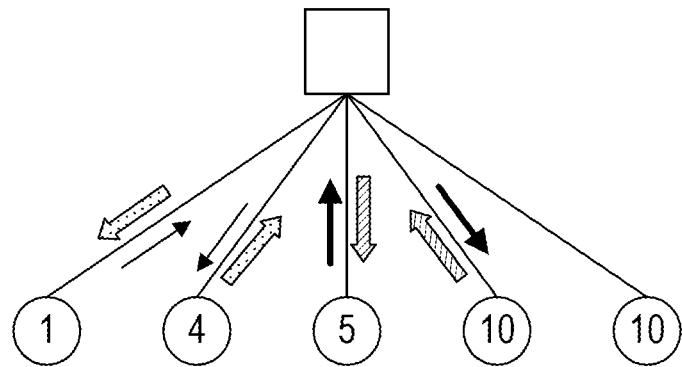

Then, the five servers have "1," "4," "5," "10," and "10," respectively, as illustrated in FIG. 15B. Then, the servers having the values of "1" and "4," respectively, share the values so that the operation of the values is performed. Further, the servers having the values of "5" and "10," respectively, share the values so that the operation of the values is performed. Here, since the plurality of packets is not simultaneously transmitted in the same direction of one route, the route contention does not occur.

Figure 16A:
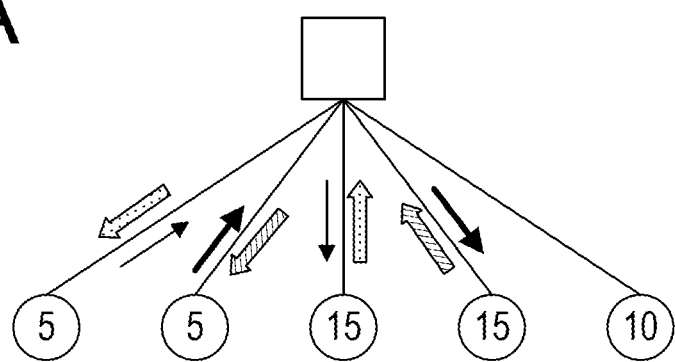
FIGS. 16A and 16B are diagrams for describing the all-reduce between the servers under the control of the switch.

Then, the five servers have "5," "5," "15," "15," and "10," respectively, as illustrated in FIG. 16A. Then, the servers having the values of "5" and "15," respectively, share the values so that the operation of the values is performed. Further, the servers having the values of "5" and "15," respectively, share the values so that the operation of the values is performed. Here, since the plurality of packets is not simultaneously transmitted in the same direction of one route, the route contention does not occur.

Figure 16B:
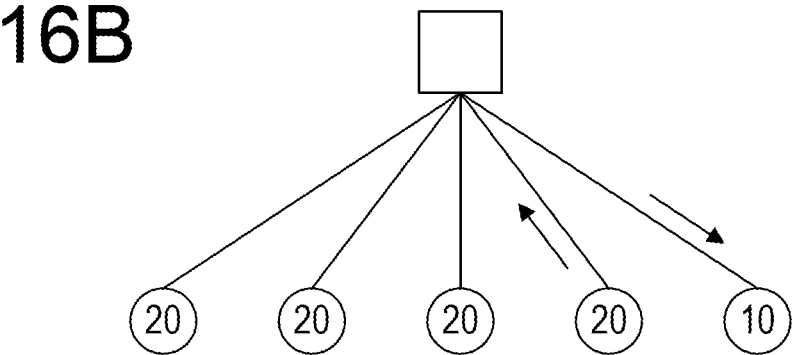

Then, the five servers have "20," "20," "20," "20," and "10," respectively, as illustrated in FIG. 16B. Then, the server having the value of "20" notifies the value of "20" to the server having the value of "10." Here, since the plurality of packets is not simultaneously transmitted in the same direction of one route, the route contention does not occur.

Figure 17:
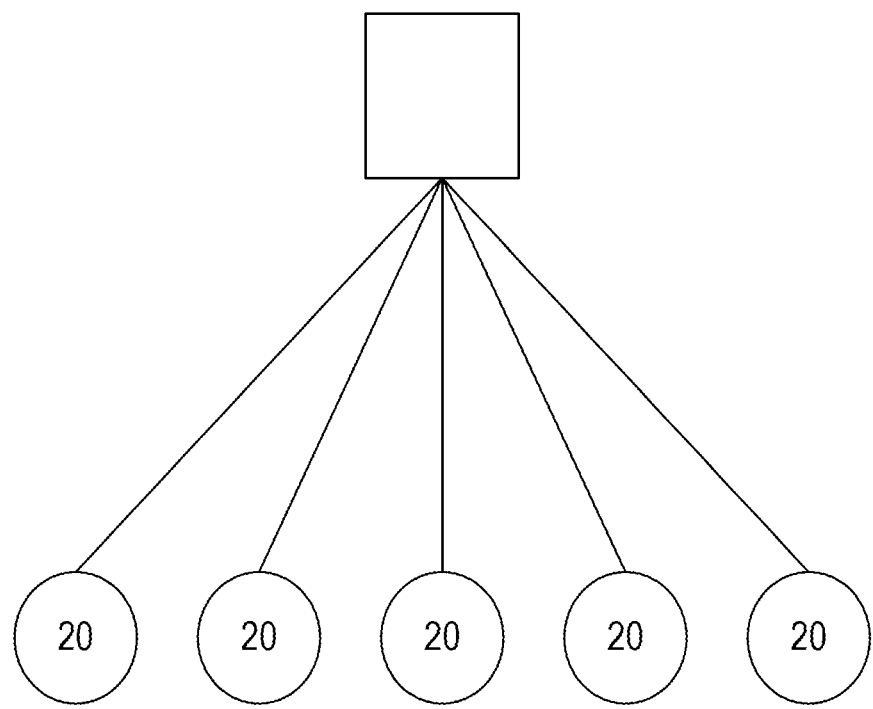
FIG. 17 is a diagram for describing the all-reduce between the servers under the control of the switch.

Then, as illustrated in FIG. 17, finally, each of the five servers has the value of "20."

Although the above description relates to an example of the all-reduce performed among a plurality of servers, the all-reduce may be performed substantially in the same manner as that in the example even in a case where the number of servers is different from that in the example.

Here, a processing of generating the communication table in a case of performing the all-reduce among n (n is a natural number) servers (hereinafter, referred to as Allreduce(n)) will be described. In the present embodiment, the communication table is generated by a recursive processing.

(1) When the number "n" of servers under the control of the switch is 1, the processing ends.

(2) When the number n of servers under the control of the switch is 2, communication information (specifically, information on a pair of servers) on a communication between two servers is written in the communication table.

(3) When the number "n" of servers under the control of the switch is an odd number 2 m+1 (m is the natural number), two servers (servers P and Q) are selected from the "n" servers, and the communication information regarding the all-reduce communication between the servers P and Q is written in the communication table. Then, Allreduce(2 m) is called for one of the servers P and Q and the (2 m−1) remaining servers (that is, 2 m servers). Then, the communication information for transmitting the result of Allreduce(2 m) from the server P to the server Q is written in the communication table.

(4) When the number of servers under the control of the switch is 2 m (m is a natural number of 2 or more), the switch is divided into "m" groups and "m" groups and Allreduce(m) is called concurrently with respect to the respective groups.

When such processing is executed, the communication table in the case of performing the all-reduce among the "n" servers is generated. As apparent from the description of FIGS. 13A and 13B to 17, when the all-reduce communication is performed according to the communication table generated by the method described above, the route contention does not occur.

Referring back to the description of FIG. 12, the communication table generation unit 301 stores the first communication table generated in step S11 in the communication table storage unit 303 (step S13). Then, the processing returns to a calling source.

FIG. 18 is a diagram illustrating an example of the first communication table. In the example of FIG. 18, a phase number and information of a pair of servers executing a communication are registered in the first communication table. A character string such as N1 represents identification information (e.g., LID) of a server. Communications 1 and 2 are executed concurrently. For example, in a phase 1, the communication between the servers N1 and N2 and the communication between the servers N3 and N4 are performed concurrently. According to the communication table illustrated in FIG. 18, a communication partner of each server in the phases 0 to 3 is as follows.

Server N1: -, N2, N3, -, Server N2: -, N1, N4, -, Server N3: -, N4, N1, -, Server N4: N5, N3, N2, N5 (transmission), Server N5:N4, -, -, N4 (reception)

Here, "-" indicates that a communication is not performed. The term "(transmission)" indicates that a transmission is performed, and the term "(reception)" indicates that a reception is performed. For example, the server N5 communicates with the server N4 in phase 0, performs no communication in phases 1 and 2, and receives data from the server N4 in phase 3. Further, in order to simplify the description, the communication information regarding the all-reduce in one switch is registered in FIG. 18, but actually the communication information regarding the all-reduce in each switch is registered.

Referring back to the description of FIG. 11, the communication table generation unit 301 executes a second generation processing which is a processing of generating the second communication table based on the information of the network topology, which is read in step S1 (step S5).

Figure 19:
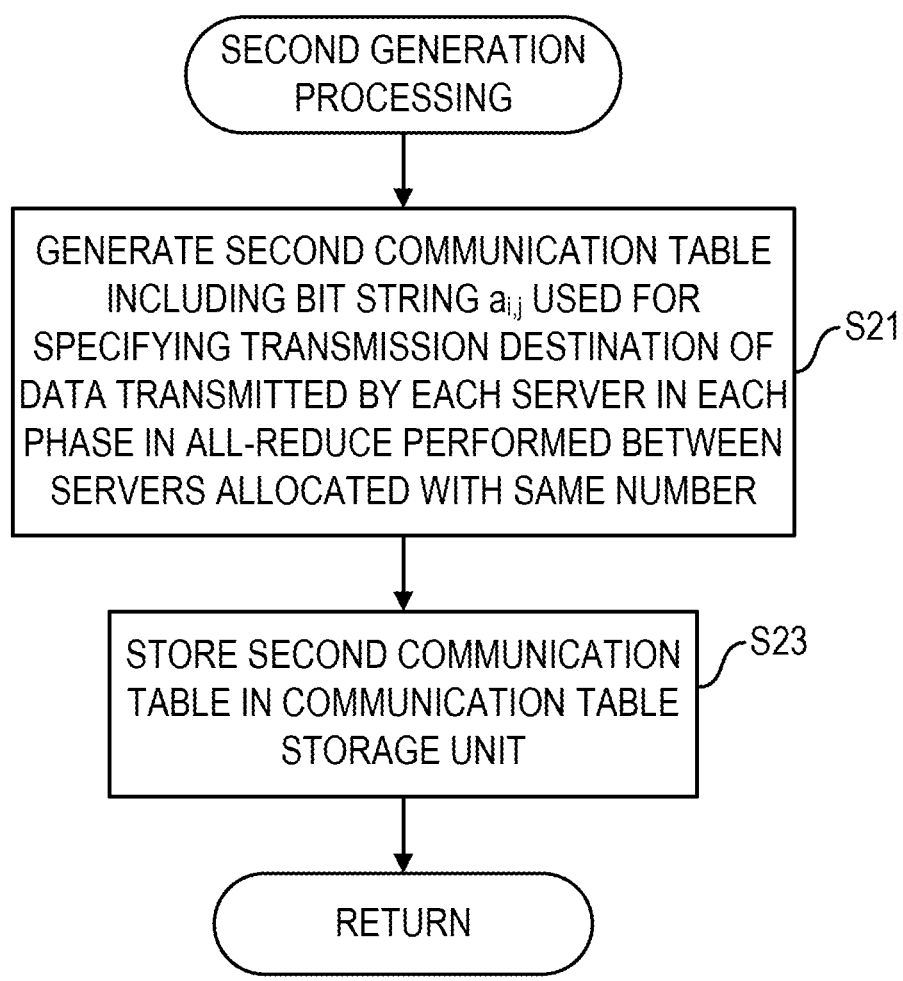
FIG. 19 is a diagram illustrating a processing flow of a second generation processing.

With reference to FIGS. 19 to 22, the second generation processing will be described. FIG. 19 is a diagram illustrating the processing flow of the second generation processing.

The communication table generation unit 301 generates the second communication table including a bit string $a_{i,j}$ used for specifying a transmission destination of data transmitted by each server in each phase in the all-reduce performed between the servers to which the same number is allocated (FIG. 19: step S21). Here, "i" is a variable representing a phase number, and "j" is a variable representing a number allocated to a server.

As described above, each switch has an identifier "s." In the present embodiment, a switch accommodating a server as a transmission destination is specified by using the identifier "s" and $a_{i,j}$. Specifically, a partner of the communication that the server whose allocation number is "j"

performs in a phase "i" is a server which is accommodated in a switch that has a bit string generated by s XOR $a_{i,j}$ as the identifier by using the identifier "s" of the switch in which the server is accommodated and the bit string $a_{i,j}$ and has the allocation number of "j."

$a_{i,j}$ has the following features.

(i) $a_{1,j}, a_{2,j}, \ldots,$ and $a_{k,j}$ are linearly independent.

(ii) $a_{i,1}, a_{i,2}, \ldots,$ and $a_{i,d-1}$ corresponds to a rearrangement of $\{1, 2, 3, \ldots, 2^d-1\}$.

A set of k-digit bit strings, $b_1, b_2, \ldots,$ and $b_k$ is linearly independent, and this means that when one or a plurality of bit strings is selected from the k bit strings and an exclusive OR is calculated, a calculation result is not 0 regardless of a combination of the selected bit strings. For example, while a set of bit strings 001, 010, and 100 is linearly independent, a set of bit strings 1010, 1111, 0101, and 1011 is not linearly independent since the calculation result of the exclusive OR of the first three bit strings is 0.

As a method for generating the set of linearly independent bit strings, provided is a cyclic scheme in which (d−1) k-digit bit strings corresponding to decimal numbers from 1 to (d−1) are arranged circularly so that k selected bit strings are linearly independent regardless of how to select k consecutive bit strings. In the cyclic scheme, for example, a greedy algorithm may be used. Further, there is also a method for generating $a_{i,j}$ from a sequence. Specifically, a processing up to a k-th row is executed in such a manner that a table of i rows and j columns is generated, the sequence is arranged as it is in a first row, the sequence is shifted by one in a horizontal direction in a second row, the sequence is shifted by two in the horizontal direction in a third row . . . .

Figure 20:
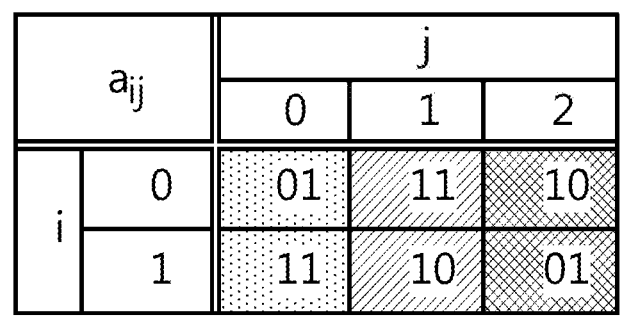

FIG. 20 is a diagram illustrating an example of the second communication table. FIG. 20 illustrates an example of the second communication table in a case of k=2. The second communication table has k rows and d columns, "i" represents a phase number, and "j" represents a number allocated to a server. Since the calculation result of the exclusive OR of the bit strings 00 and 11 in a first column is 11, the bit strings 00 and 11 in the first column are linearly independent. Since the calculation result of the exclusive OR of the bit strings 11 and 10 in a second column is 01, the bit strings 11 and 10 in the second column are linearly independent. Since the calculation result of the exclusive OR of the bit strings 10 and 01 in a third column is 11, the bit strings 10 and 01 in the third column are linearly independent. The linearly independent bit strings in each column correspond to the requirement provided such that the all-reduce communication is possible. Further, the bit strings corresponding to the decimal number from 1 to (d−1) in each phase correspond to the requirement provided such that no contention occurs.

Figure 21:
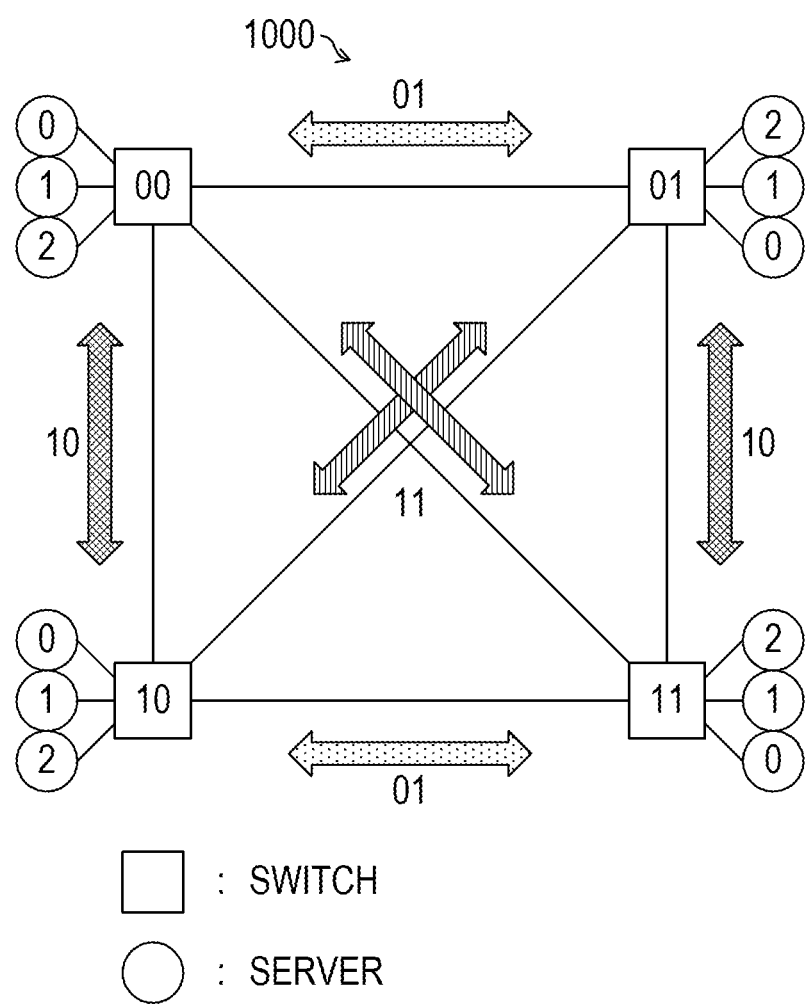
FIG. 21 is a diagram for describing a communication performed in accordance with the second communication table.
Figure 22:
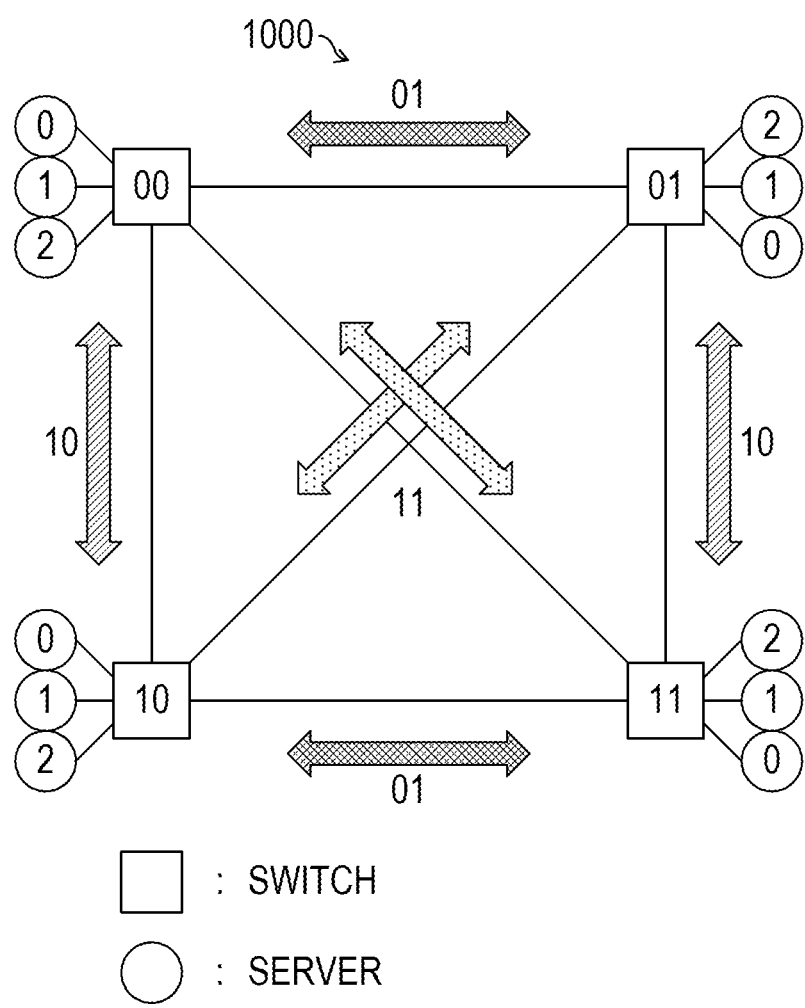
FIG. 22 is a diagram for describing the communication performed in accordance with the second communication table.

With reference to FIGS. 21 and 22, the communication performed according to the second communication table will be described. In the example of FIG. 20, a two-phase communication is performed, the phase 0 corresponds to the communication of FIG. 21, and the phase 1 corresponds to the communication of FIG. 22. In FIGS. 21 and 22, an arrow represents the communication, and the hatching types in FIG. 20 correspond to the hatching types in FIGS. 21 and 22. A number string in the switch represents the identifier (e.g., bit string), and a number in the server is a number allocated to the server.

First, the communication of phase 0 will be described. When a server is under the control of switch 00 and has an allocation number of 0, since the result of the exclusive OR of 00 and 01 is 01, the server communicates with a server which is under the control of switch 01 and has the allocation number of 0. When a server is under the control of switch 00 and has an allocation number of 1, since the result of the exclusive OR of 00 and 11 is 11, the server communicates with a server which is under the control of switch 11 and has the allocation number of 1. When a server is under the control of switch 00 and has an allocation number of 2, since the result of the exclusive OR of 00 and 10 is 10, the server communicates with a server which is under the control of switch 10 and has the allocation number of 2.

When a server is under the control of switch 01 and has the allocation number of 0, since the result of the exclusive OR of 01 and 01 is 00, the server communicates with a server which is under the control of switch 00 and has the allocation number of 0. When a server is under the control of switch 01 and has the allocation number of 1, since the result of the exclusive OR of 01 and 11 is 10, the server communicates with a server which is under the control of switch 10 and has the allocation number of 1. When a server is under the control of switch 01 and has the allocation number of 2, since the result of the exclusive OR of 01 and 10 is 11, the server communicates with a server which is under the control of switch 11 and has the allocation number of 2.

When a server is under the control of switch 10 and has the allocation number of 0, since the result of the exclusive OR of 10 and 01 is 11, the server communicates with a server which is under the control of switch 11 and has the allocation number of 0. When a server is under the control of switch 10 and has the allocation number of 1, since the result of the exclusive OR of 10 and 11 is 01, the server communicates with a server which is under the control of switch 01 and has the allocation number of 1. When a server is under the control of switch 10 and has the allocation number of 2, since the result of the exclusive OR of 10 and 10 is 00, the server communicates with a server which is under the control of switch 00 and has the allocation number of 2.

When a server is under the control of switch 11 and has the allocation number of 0, since the result of the exclusive OR of 11 and 01 is 10, the server communicates with a server which is under the control of switch 10 and has the allocation number of 0. When a server is under the control of switch 11 and has the allocation number of 1, since the result of the exclusive OR of 11 and 11 is 00, the server communicates with a server which is under the control of switch 00 and has the allocation number of 1. When a server is under the control of switch 11 and has the allocation number of 2, since the result of the exclusive OR of 11 and 10 is 01, the server communicates with a server which is under the control of switch 01 and has the allocation number of 2.

Next, the communication of phase 1 will be described. When a server is under the control of switch 00 and has the allocation number of 0, since the result of the exclusive OR of 00 and 11 is 11, the server communicates with a server which is under the control of switch 11 and has the allocation number of 0. When a server is under the control of switch 00 and has the allocation number of 1, since the result of the exclusive OR of 00 and 10 is 10, the server communicates with a server which is under the control of switch 10 and has the allocation number of 1. When a server is under the control of switch 00 and has the allocation number of 2, since the result of the exclusive OR of 00 and 01 is 01, the server communicates with a server which is under the control of switch 01 and has the allocation number of 2.

When a server is under the control of switch 01 and has the allocation number of 0, since the result of the exclusive OR of 01 and 11 is 10, the server communicates with a server which is under the control of switch 10 and has the allocation number of 0. When a server is under the control of switch 01 and has the allocation number of 1, since the result of the exclusive OR of 01 and 10 is 11, the server communicates with a server which is under the control of switch 11 and has the allocation number of 1. When a server is under the control of switch 01 and has the allocation number of 2, since the result of the exclusive OR of 01 and 01 is 00, the server communicates with a server which is under the control of switch 00 and has the allocation number of 2.

When a server is under the control of switch 10 and has the allocation number of 0, since the result of the exclusive OR of 10 and 11 is 01, the server communicates with a server which is under the control of switch 01 and has the allocation number of 0. When a server is under the control of switch 10 and has the allocation number of 1, since the result of the exclusive OR of 10 and 10 is 00, the server communicates with a server which is under the control of switch 00 and has the allocation number of 1. When a server is under the control of switch 10 and has the allocation number of 2, since the result of the exclusive OR of 10 and 01 is 11, the server communicates with a server which is under the control of switch 11 and has the allocation number of 2.

When a server is under the control of switch 11 and has the allocation number of 0, since the result of the exclusive OR of 11 and 11 is 00, the server communicates with a server which is under the control of switch 00 and has the allocation number of 0. When a server is under the control of switch 11 and has the allocation number of 1, since the result of the exclusive OR of 11 and 10 is 01, the server communicates with a server which is under the control of switch 01 and has the allocation number of 1. When a server is under the control of switch 11 and has the allocation number of 2, since the result of the exclusive OR of 11 and 01 is 10, the server communicates with a server which is under the control of switch 10 and has the allocation number of 2.

As described above, packets in the same direction are not simultaneously transmitted even in any communication route. That is, the route contention does not occur.

Referring back to the description of FIG. 19, the communication table generation unit 301 stores the second communication table generated in step S21 in the communication table storage unit 303 (step S23). In addition, the processing returns to the calling source.

Referring back to the description of FIG. 11, the communication table generation unit 301 reads the first and second communication tables stored in the communication table storage unit 303 and transmits the read first and second communication tables to each server in the single-layer full mesh system 1000 (step S7). Then, the processing ends.

When such processing is executed, each server may execute the all-reduce communication in an appropriate order according to the first and second communication tables.

Next, with reference to FIGS. 23 and 24, the processing executed by the server will be described. The processing is a processing executed by each server which receives the first and second communication tables from the management apparatus 3.

Figure 23:
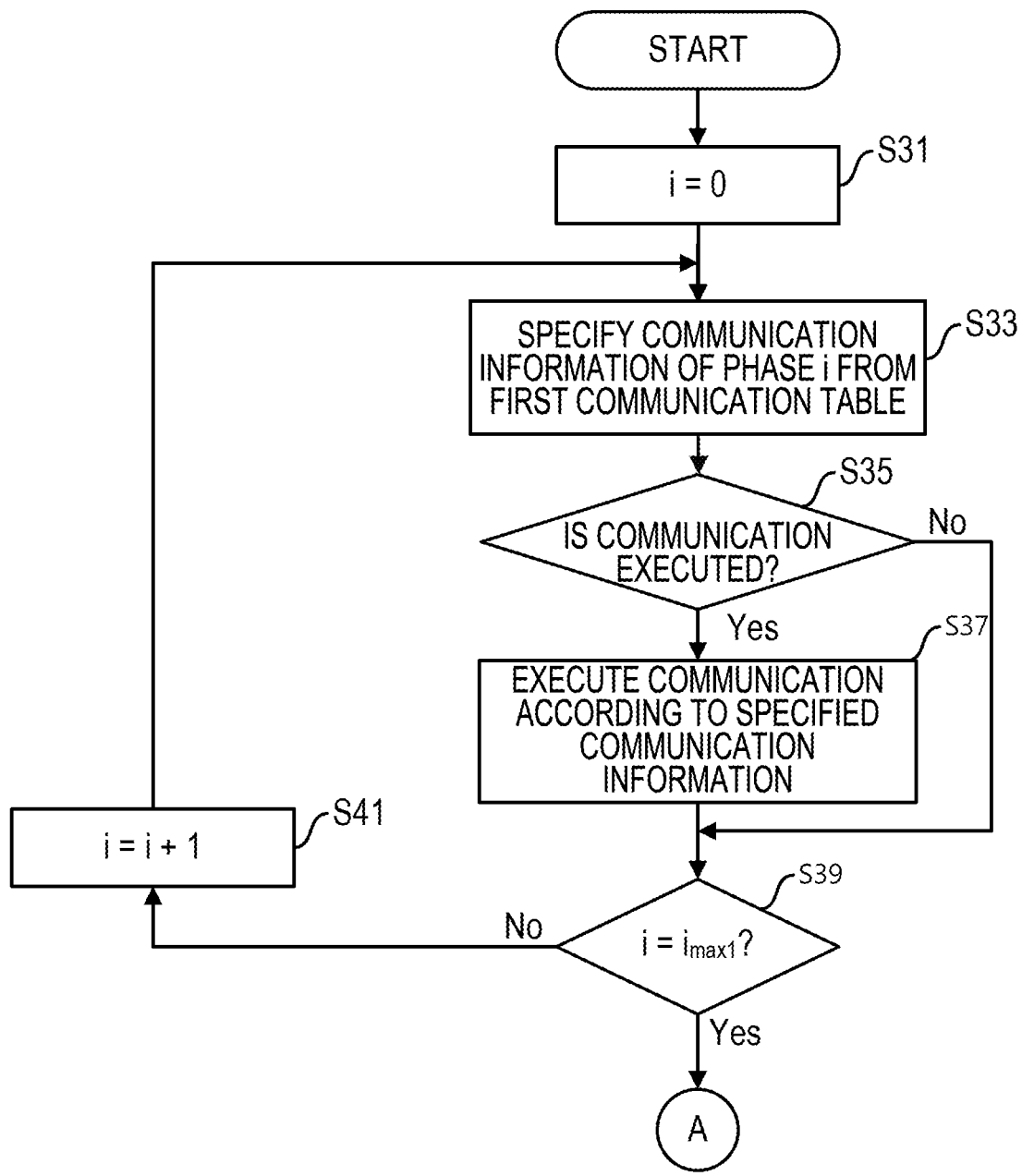
FIG. 23 is a diagram illustrating a processing flow of a processing executed by the server according to the first embodiment.

FIG. 23 is a diagram illustrating the processing flow of the processing executed by the server.

The first communication unit 1011 in the server sets the variable representing the phase number to 0 (FIG. 23: step S31).

The first communication unit 1011 specifies communication information of a phase "i" from the first communication table stored in the communication table storage unit 103 (step S33).

The first communication unit 1011 determines whether its own server (that is, the server that executes the processing) executes the communication in phase "i" (step S35). Whether the own server executes the communication in phase "i" is determined depending on whether the specified communication information includes the identification information of the own server.

When it is determined that the own server does not execute the communication in phase "i" (step S35: "No" route), the processing proceeds to step S39. Meanwhile, when it is determined that the own server executes the communication in phase "i" (step S35: "Yes" route), the first communication unit 1011 executes the communication according to the communication information specified at step S33 (step S37).

As described above, the communication performed according to the first communication table is the all-reduce communication between the servers under the control of the same switch, and each server executes the operation related to the all-reduce.

The first communication unit 1011 determines whether i is established (step S39). The symbol "$i_{max1}$" is a maximum value of the phase number of the communication performed according to the first communication table. When it is determined that i=$i_{max1}$ is not established (step S39: "No" route), the first communication unit 1011 increments "i" by 1 (step S41). Then, the processing proceeds to step S33. Further, the end of the phase is confirmed by barrier synchronization.

Meanwhile, when it is determined that i=$i_{max1}$ i is established (step S39: "Yes" route), the processing proceeds to step S43 of FIG. 24 via terminal A.

Figure 24:
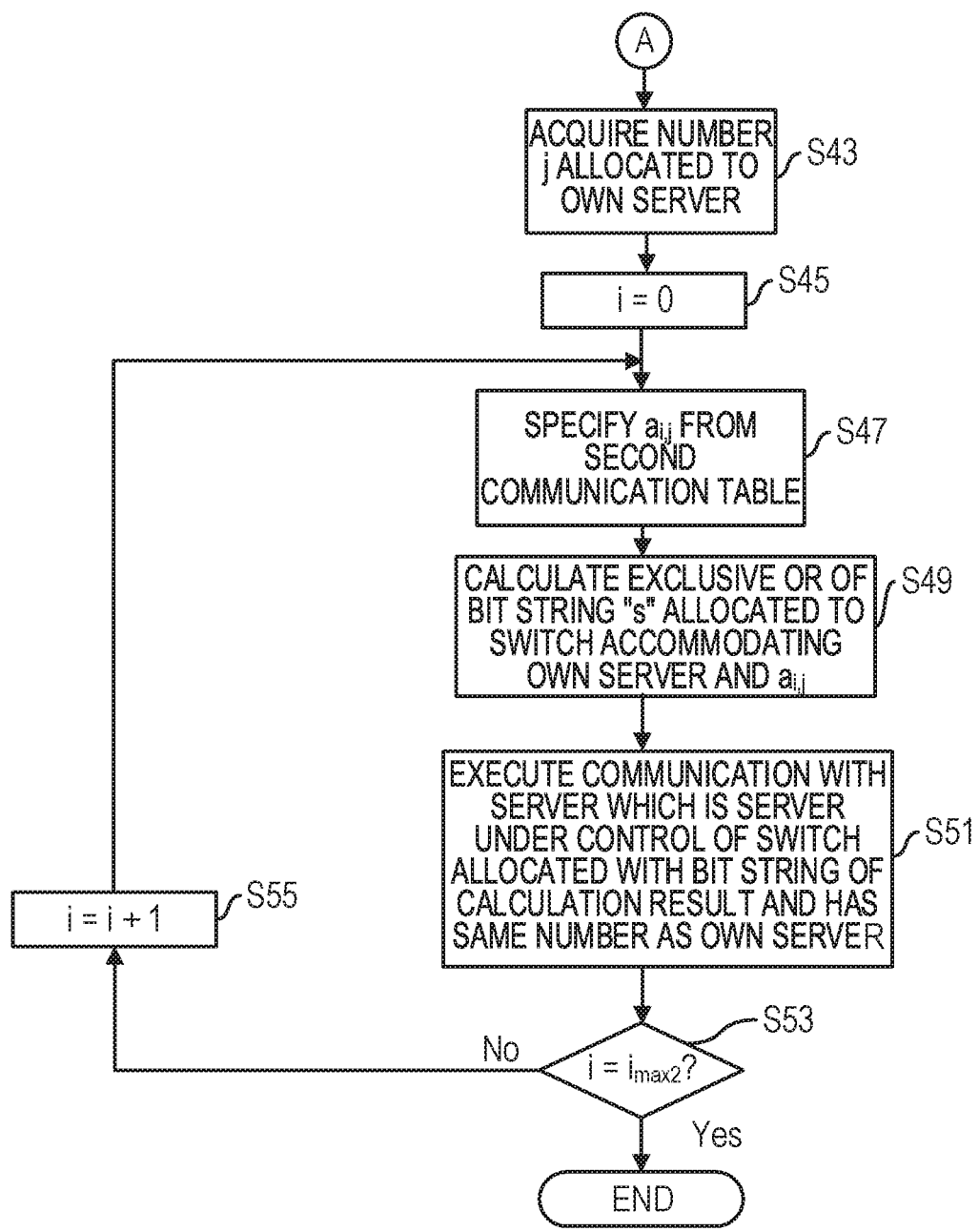
FIG. 24 is a diagram illustrating the processing flow of the processing executed by the server according to the first embodiment.

Referring to the description of FIG. 24, the second communication unit 1013 acquires the number "j" allocated to its own server from a memory device such as a memory (FIG. 24: step S43).

The second communication unit 1013 sets the variable "i" representing the phase number to 0 (step S45).

The second communication unit 1013 calls the bit string generation unit 105. As a result, the bit string generation unit 105 specifies the bit string $a_{i,j}$ from the second communication table stored in the communication table storage unit 103 (step S47).

The bit string generation unit 105 calculates the exclusive OR of the bit string "s" allocated to the switch accommodating its own server and the bit string $a_{i,j}$ specified in step S47 (step S49). The bit string generation unit 105 transfers the bit string of the calculation result of step S49 to the second communication unit 1013.

The second communication unit 1013 is a server under the control of the switch to which the bit string of the calculation result of step S49 is allocated, and executes a communication with a server to which the same number as that of the own server is allocated (step S51).

When the processing of step S51 ends, the second communication unit 1013 determines whether i=$i_{max2}$ is established (step S53). The symbol "$i_{max2}$" is the maximum value of the phase number of the communication performed according to the second communication table. When it is determined that i=$i_{max2}$ is not established (step S53: "No"

route), the second communication unit 1013 increments "i" by 1 (step S55). Then, the processing proceeds to step S47. Further, the end of the phase is confirmed by the barrier synchronization.

Meanwhile, when it is determined that $i=i_{max2}$ is established (step S53: "Yes" route), the processing ends.

As described above, all of the servers have the same value under the control of each switch by the communication according to the first communication table. In addition, by the communication according to the second communication table, all of the servers in the single-layer full mesh system 1000 have the same value. That is, in the single-layer full mesh system 1000, the all-reduce is implemented.

As described above, in the present embodiment, the route contention does not occur in the process of the all-reduce communication.

According to the method of the present embodiment, the all-reduce may be executed with a calculation amount of approximately O(log n) (n is the total number of servers). A base of a logarithm is 2.

Second Embodiment

By connecting a plurality of single-layer full mesh systems 1000 according to the first embodiment, it is possible to construct a multi-layer full mesh system 2000. Hereinafter, a method for avoiding the occurrence of the route contention when the all-reduce communication is performed in the multi-layer full mesh system 2000 will be described.

Figure 25:
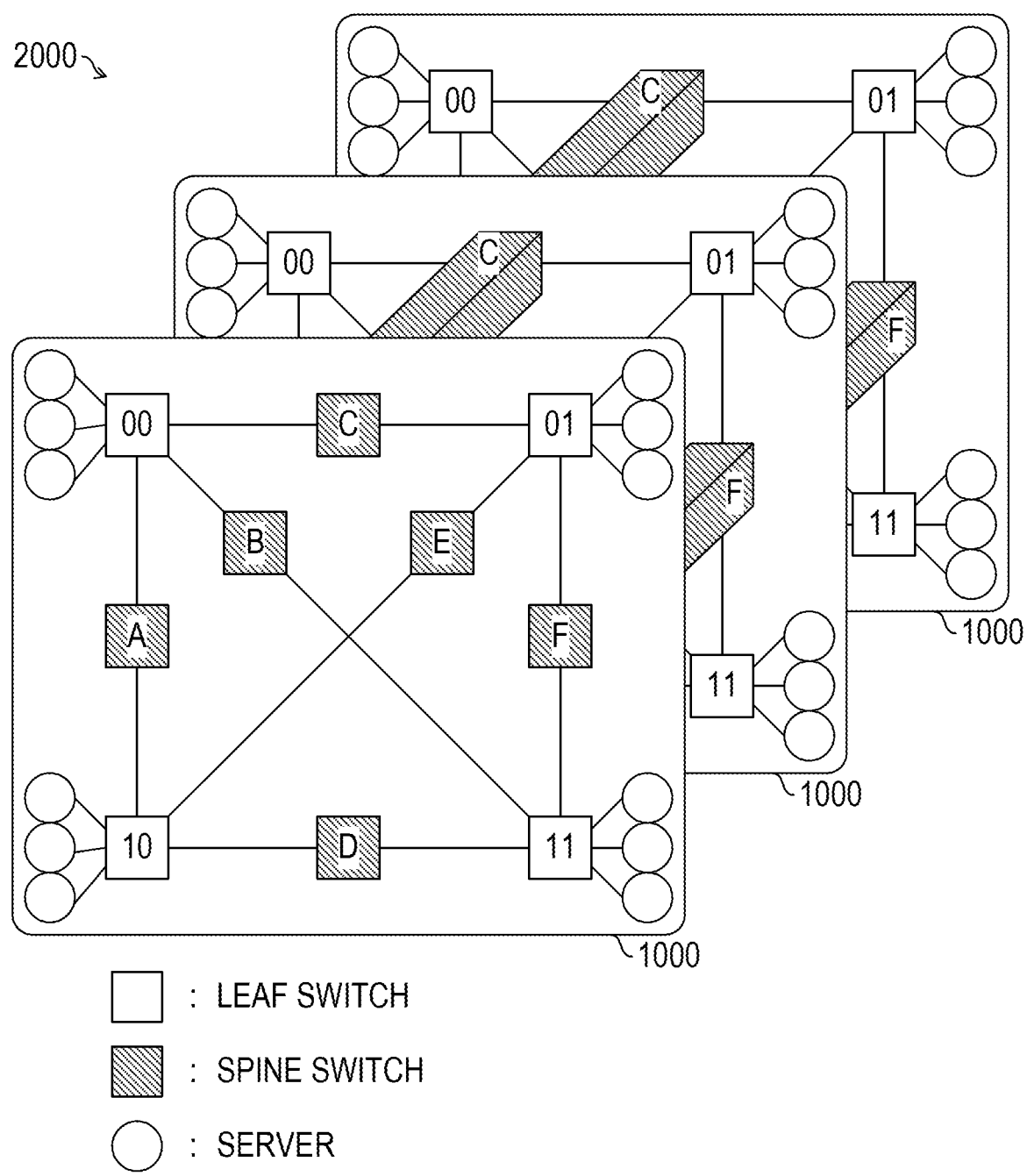
FIG. 25 is a diagram illustrating a multi-layer full mesh system according to a second embodiment.

FIG. 25 is a diagram illustrating a multi-layer full mesh system 2000 according to a second embodiment. In FIG. 25, three single-layer full mesh systems 1000 are connected to each other by spine switches A to F. In the example of FIG. 25, the number of ports of the leaf switch and the spine switch is 6, the number of layers is 3, and 36 servers are included in the multi-layer full mesh system 2000. However, the number of ports of the leaf switch and the spine switch, the number of layers, and the number of servers are not limited to the example illustrated in FIG. 25.

Since each single-layer full mesh system 1000 illustrated in FIG. 25 is the same as the single-layer full mesh system 1000 in the first embodiment except for the existence of spine switches A to F, a detailed description thereof will be herein omitted.

The spine switch A is connected to the leaf switches 00 and 10 in each layer. The spine switch B is connected to the leaf switches 00 and 11 in each layer. The spine switch C is connected to the leaf switches 00 and 01 in each layer. The spine switch D is connected to the leaf switches 10 and 11 in each layer. The spine switch E is connected to the leaf switches 01 and 10 in each layer. The spine switch F is connected to the leaf switches 01 and 11 in each layer.

Figure 26:
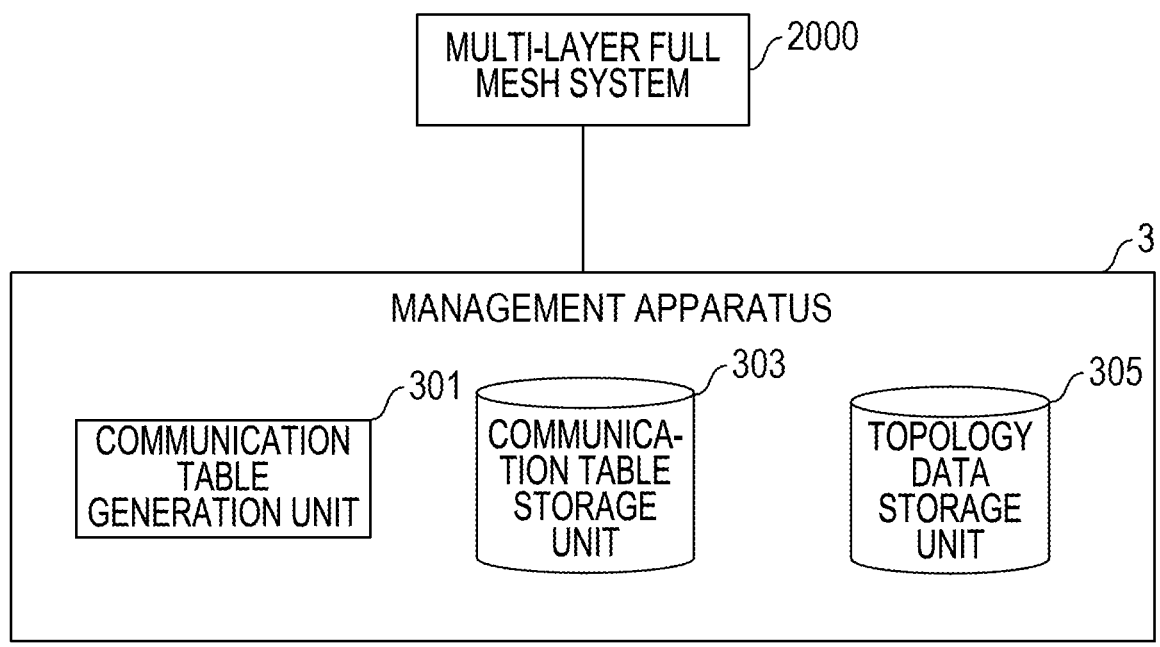
FIG. 26 is a functional block diagram of a management apparatus according to the second embodiment.

As illustrated in FIG. 26, the multi-layer full mesh system 2000 is connected to the management apparatus 3 through, for example, a local area network (LAN), and as a result, the communication in the multi-layer full mesh system 2000 is managed by the management apparatus 3. The management apparatus 3 includes a communication table generation unit 301, a communication table storage unit 303, and a topology data storage unit 305.

The communication table generation unit 301 generates third, fourth, and fifth communication tables based on the information of the network topology of the multi-layer full mesh system 2000 stored in the topology data storage unit 305, and stores the generated third, fourth, and fifth communication tables in the communication table storage unit 303. The communication table generation unit 301 transmits the third, fourth, and fifth communication tables stored in the communication table storage unit 303 to each server in the multi-layer full mesh system 2000 at a predetermined timing or according to a request.

Figure 27:
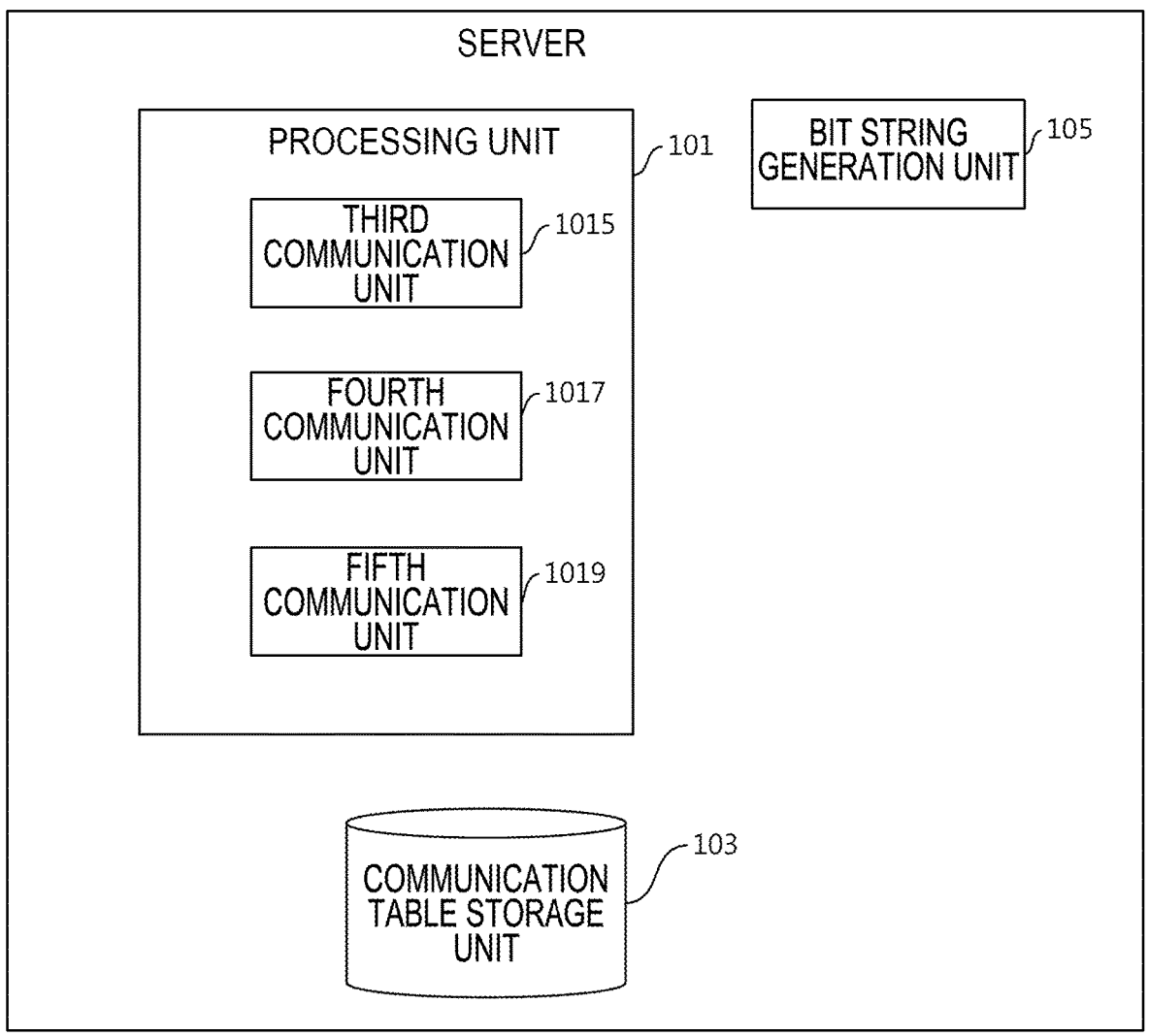
FIG. 27 is a functional block diagram of a server according to the second embodiment.

FIG. 27 is a functional block diagram of a server. The server includes the processing unit 101, the communication table storage unit 103, and the bit string generation unit 105. The processing unit 101 includes a third communication unit 1015, a fourth communication unit 1017, and a fifth communication unit 1019.

The communication table storage unit 103 stores the third, fourth, and fifth communication tables received from the management apparatus 3. The bit string generation unit 105 generates the bit string based on the fifth communication table stored in the communication table storage unit 103. The third communication unit 1015 in the processing unit 101 performs the communication according to the third communication table stored in the communication table storage unit 103. The fourth communication unit 1017 in the processing unit 101 performs the communication according to the fourth communication table stored in the communication table storage unit 103. The fifth communication unit 1019 in the processing unit 101 performs the communication based on the bit string generated by the bit string generation unit 105.

Next, with reference to FIGS. 28 to 32, the processing executed by the management apparatus 3 will be described.

Figure 28:
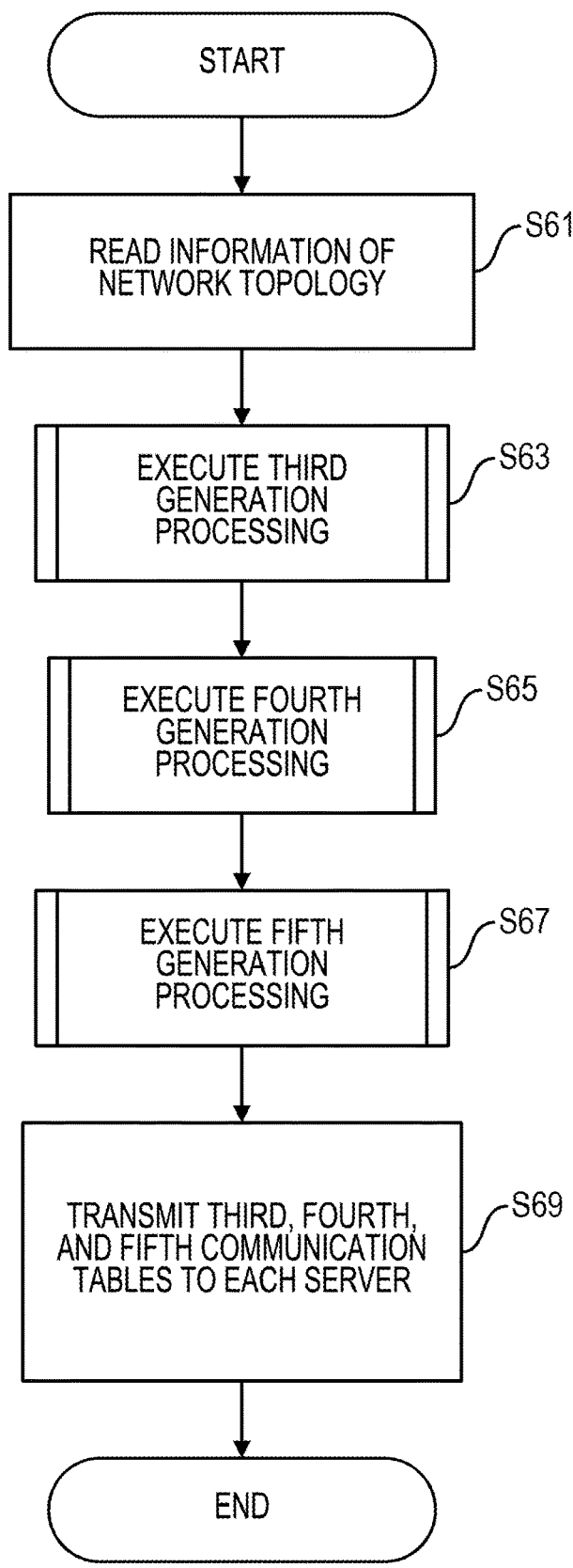
FIG. 28 is a diagram illustrating a processing flow of a processing executed by the management apparatus according to the second embodiment.

FIG. 28 is a diagram illustrating a processing flow of the processing executed by the management apparatus 3.

The communication table generation unit 301 in the management apparatus 3 reads the information of the network topology of the multi-layer full mesh system 2000 from the topology data storage unit 305 (FIG. 28: step S61). The information of the network topology includes, for example, information on a connection relationship among the leaf switch, the spine switch, and the server.

The communication table generation unit 301 executes a third generation processing which is a processing of generating the third communication table, based on the information of the network topology, which is read in step S61 (step S63).

Figure 29:
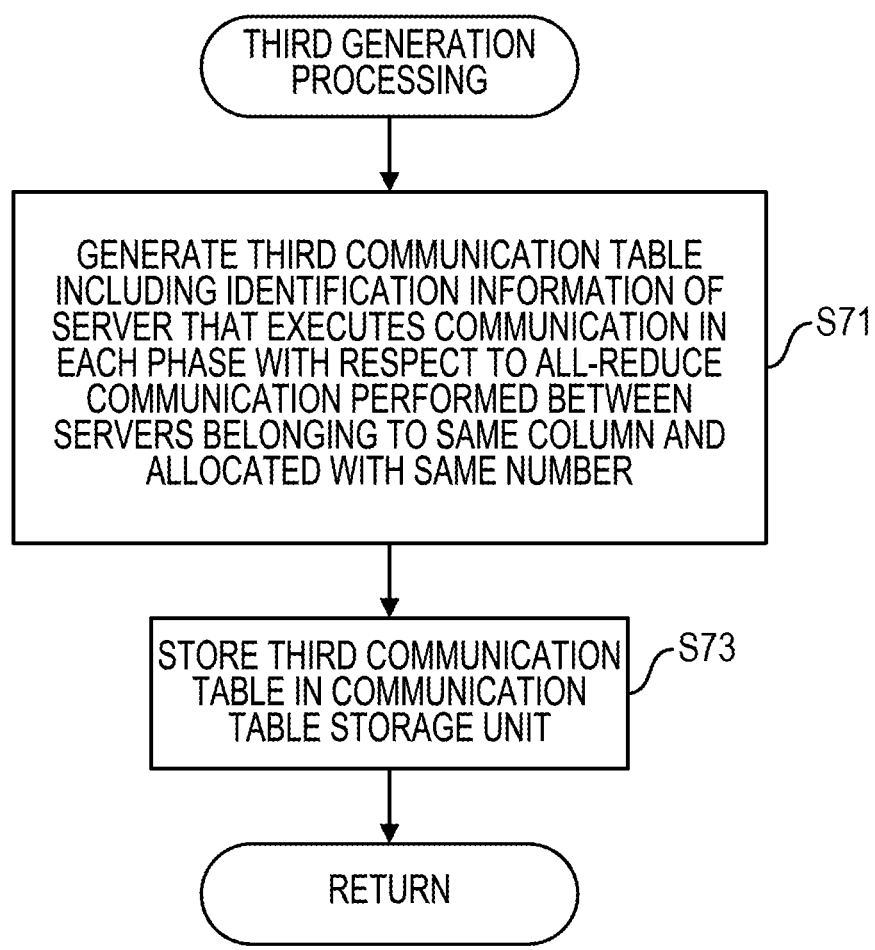
FIG. 29 is a diagram illustrating a processing flow of a third generation processing.

With reference to FIGS. 29 and 30A to 30C, the third generation processing will be described. FIG. 29 is a diagram illustrating the processing flow of the third generation processing.

The communication table generation unit 301 generates the third communication table including identification information of a server that executes a communication in each phase with respect to the all-reduce communication performed among servers belonging to the same column and allocated with the same number (step S71).

In the present embodiment, a column includes the leaf switches present at the same position in the respective layers and the servers under the control of the leaf switches. For example, in FIG. 30A, the leaf switch 00 and the servers under the control of the leaf switch 00 in each layer belong to the same column. Similarly, the leaf switch 01 and the servers under the control of the leaf switch 01 in each layer belong to the same column. Similarly, the leaf switch 10 and the servers under the control of the leaf switch 10 in each layer belong to the same column. Similarly, the leaf switch 11 and the servers under the control of the leaf switch 11 in each layer belong to the same column.

In other words, the leaf switch connected to the same spine switch and the servers under the control of the leaf switch belong to the same column. For example, since the leaf switch 00 in each layer is connected to the spine switches A, B, and C, the leaf switch 00 in each layer belongs to the same column and the servers under the control of the leaf switch 00 in each layer also belongs to the same column. Similarly, since the leaf switch 01 in each layer is connected to the spine switches C, E, and F, the leaf switch 01 in each layer belongs to the same column and the servers under the control of the leaf switch 01 in each layer also belongs to the same column. Similarly, since the leaf switch 10 in each layer is connected to the spine switches A, D, and E, the leaf switch 10 in each layer belongs to the same column and the servers under the control of the leaf switch 10 in each layer also belongs to the same column. Similarly, since the leaf switch 11 in each layer is connected to the spine switches B, D, and F, the leaf switch 11 in each layer belongs to the same column and the servers under the control of the leaf switch 11 in each layer also belongs to the same column.

Figure 30A:
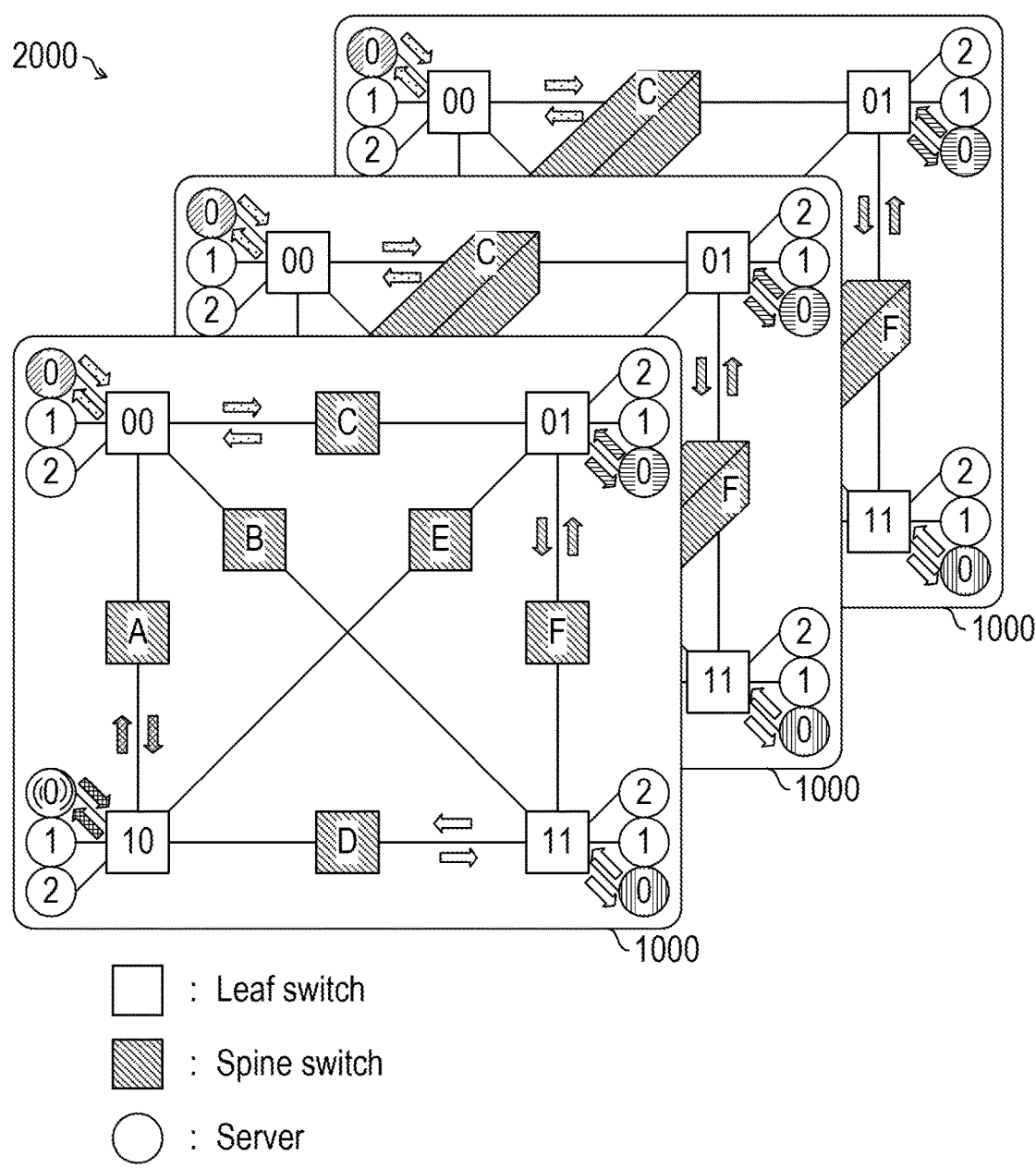
FIG. 30A is a diagram for describing a communication performed in accordance with a third communication table.
Figure 30B:
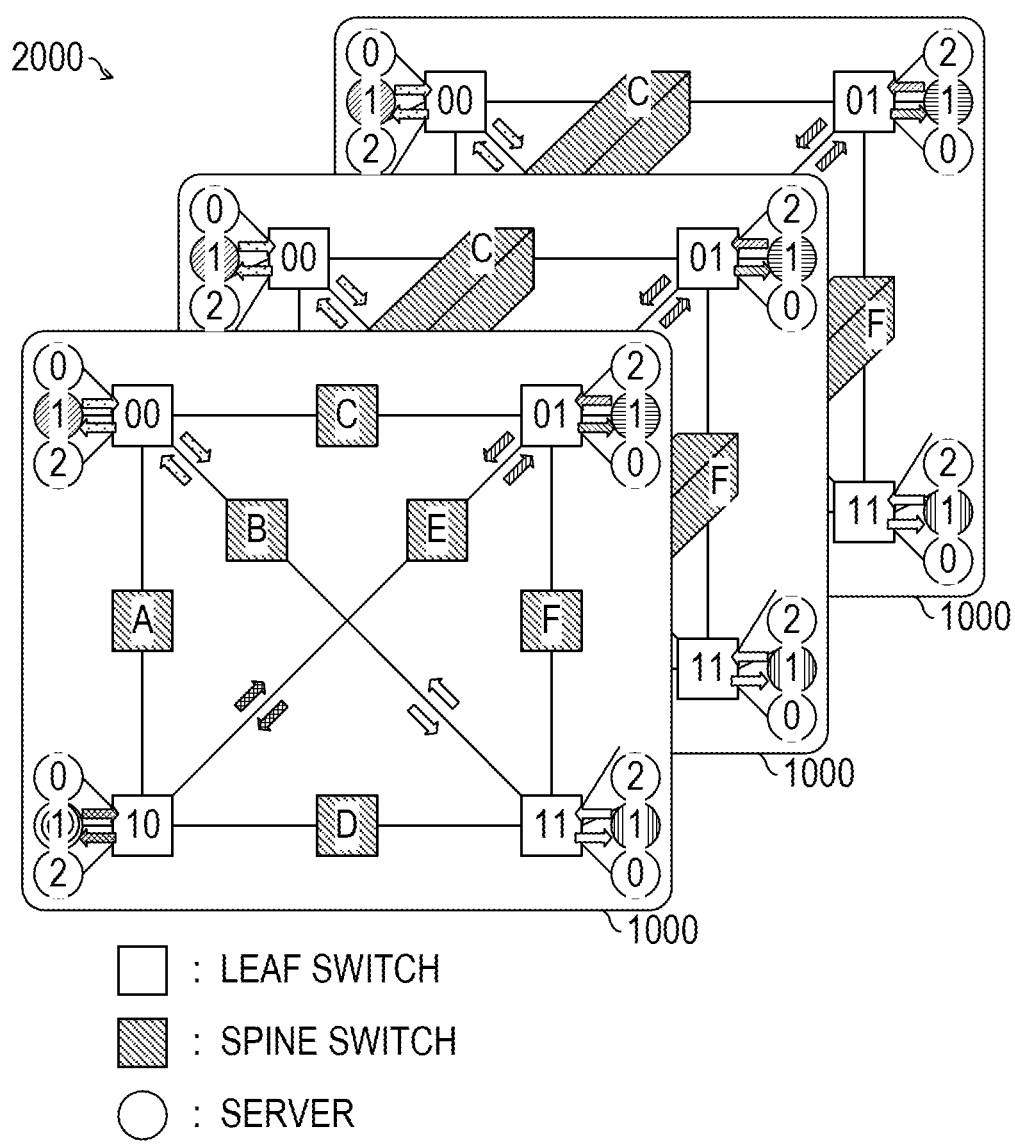
FIG. 30B is a diagram for describing the communication performed in accordance with the third communication table.
Figure 30C:
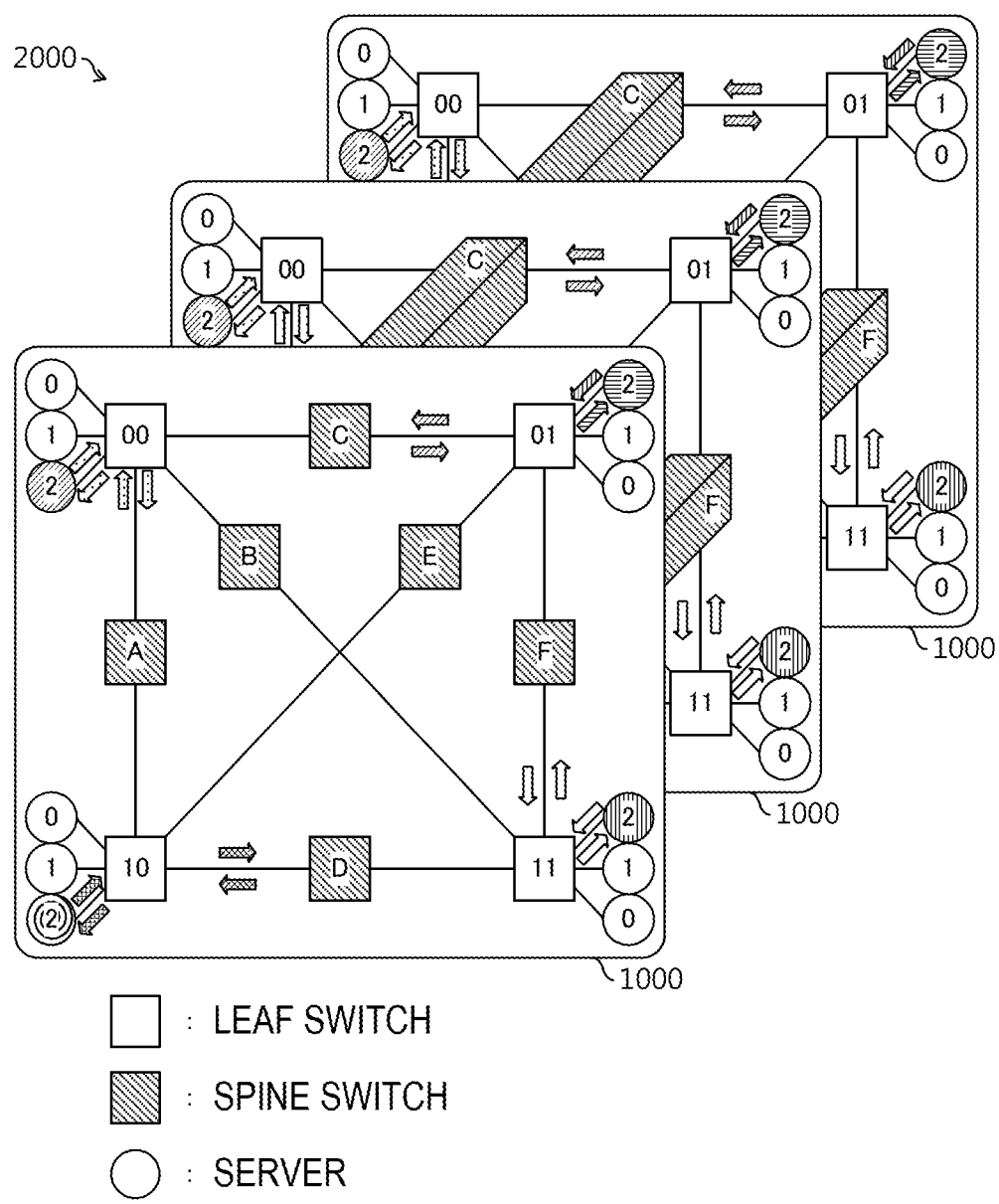
FIG. 30C is a diagram for describing the communication performed in accordance with the third communication table.

In the all-reduce performed according to the third communication table, "d" servers under the control of each leaf switch perform the communication concurrently. Herein, as illustrated in FIGS. 30A to 30C, when the servers of the respective numbers perform the communication through different routes (that is, links), a plurality of packets in the same direction does not pass on the route at the same time. Therefore, the route contention does not occur in the all-reduce performed according to the third communication table. Further, the same spine switch processes the plurality of packets at the same time, which does not cause not only the route contention but also a reduction in throughput.

The third communication table is generated in the same manner as used for the first communication table.

A time required for the all-reduce performed according to the third communication table is expressed by t*log(d). Here, "t" represents a time required for each server to send data.

Referring back to the description of FIG. 29, the communication table generation unit 301 stores the third communication table generated in step S71 in the communication table storage unit 303 (step S73). In addition, the processing returns to the calling source.

Referring back to the description of FIG. 28, the communication table generation unit 301 executes a fourth generation processing which is a processing of generating the fourth communication table based on the information of the network topology, which is read in step S61 (step S65).

Figure 31:
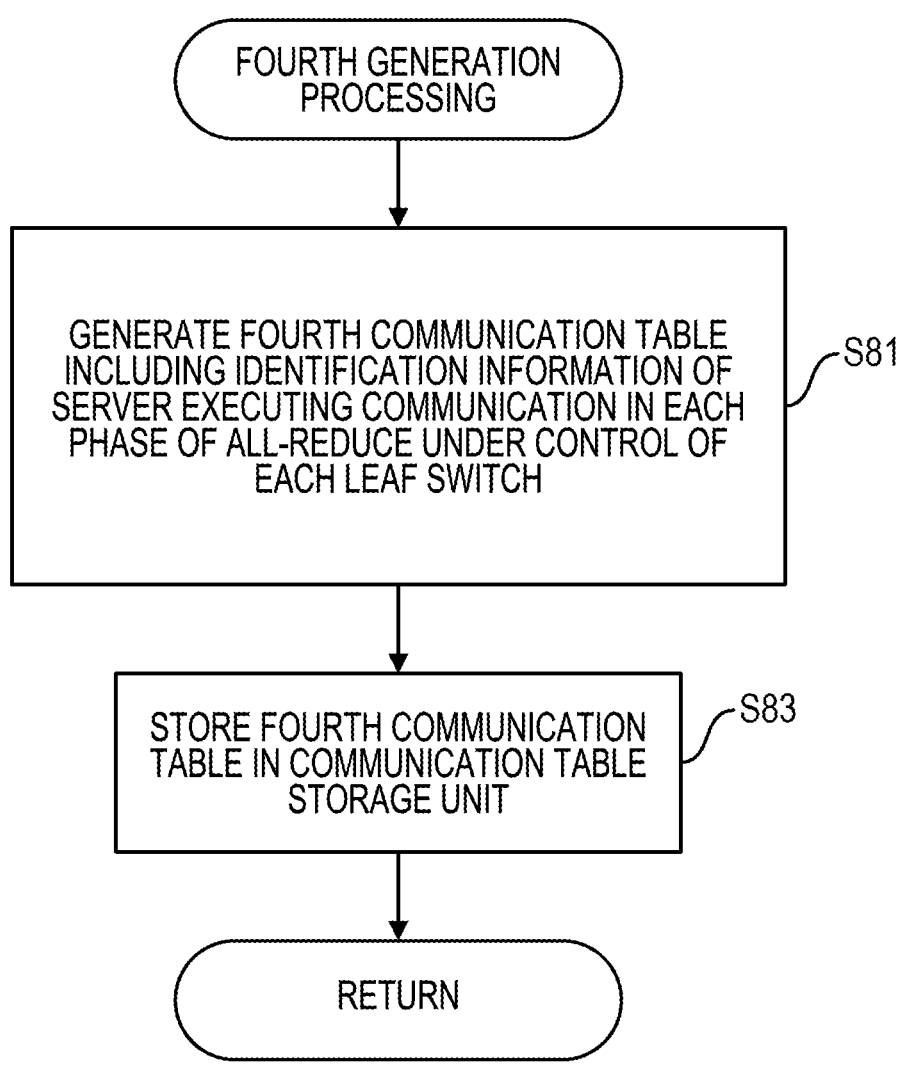
FIG. 31 is a diagram illustrating a processing flow of a fourth generation processing.

With reference to FIG. 31, the fourth generation processing will be described. FIG. 31 is a diagram illustrating the processing flow of the fourth generation processing.

The communication table generation unit 301 generates the fourth communication table including the identification information of the server that executes the communication in each phase of the all-reduce under the control of each leaf switch in the multi-layer full mesh system 2000 (FIG. 31: step S81).

In step S81, a processing similar to the processing in step S11 is executed for the plurality of single-layer full mesh systems 1000. Therefore, the fourth communication table includes the communication information on each layer. The fourth communication table is generated in the same manner as used for the first communication table.

The communication table generation unit 301 stores the fourth communication table generated in step S81 in the communication table storage unit 303 (step S83). Then, the processing returns to the calling source.

Referring back to the description of FIG. 28, the communication table generation unit 301 executes a fifth generation processing which is a processing of generating the fifth communication table based on the information of the network topology, which is read in step S61 (step S67).

Figure 32:
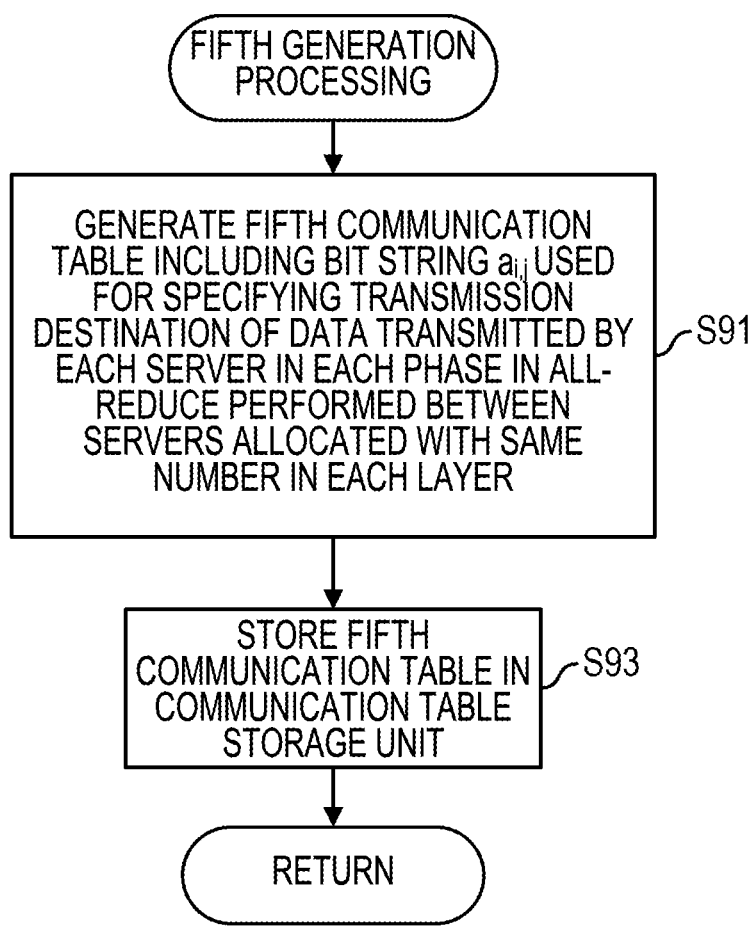
FIG. 32 is a diagram illustrating a processing flow of a fifth generation processing.

With reference to FIG. 32, the fifth generation processing will be described. FIG. 32 is a diagram illustrating the processing flow of the fifth generation processing.

The communication table generation unit 301 generates the fifth communication table including the bit string $a_{i,j}$ used for specifying the transmission destination of data transmitted by each server in each phase in the all-reduce performed between the servers to which the same number is allocated in each layer (FIG. 32: step S91). Herein, "i" represents the variable representing the phase number, and "j" is the variable representing the number allocated to the server.

In step S91, a processing similar to the processing in step S21 is executed for the plurality of single-layer full mesh systems 1000. In the second embodiment, since the communication table illustrated in FIG. 20 is generated for each layer, the fifth communication table includes a communication table for each layer.

The communication table generation unit 301 stores the fifth communication table generated in step S91 in the communication table storage unit 303 (step S93). Then, the processing returns to the calling source.

Referring back to the description of FIG. 28, the communication table generation unit 301 reads the third, fourth, and fifth communication tables stored in the communication table storage unit 303 and transmits the read third, fourth, and fifth communication tables to each server in the multi-layer full mesh system 2000 (step S69). Then, the processing ends.

When such processing is executed, each server may execute the all-reduce communication in an appropriate order according to the third, fourth, and fifth communication tables.

Next, with reference to FIGS. 33 to 35, the processing executed by the server will be described. The processing is processing executed by each server which receives the third, fourth, and fifth communication tables from the management apparatus 3.

Figure 33:
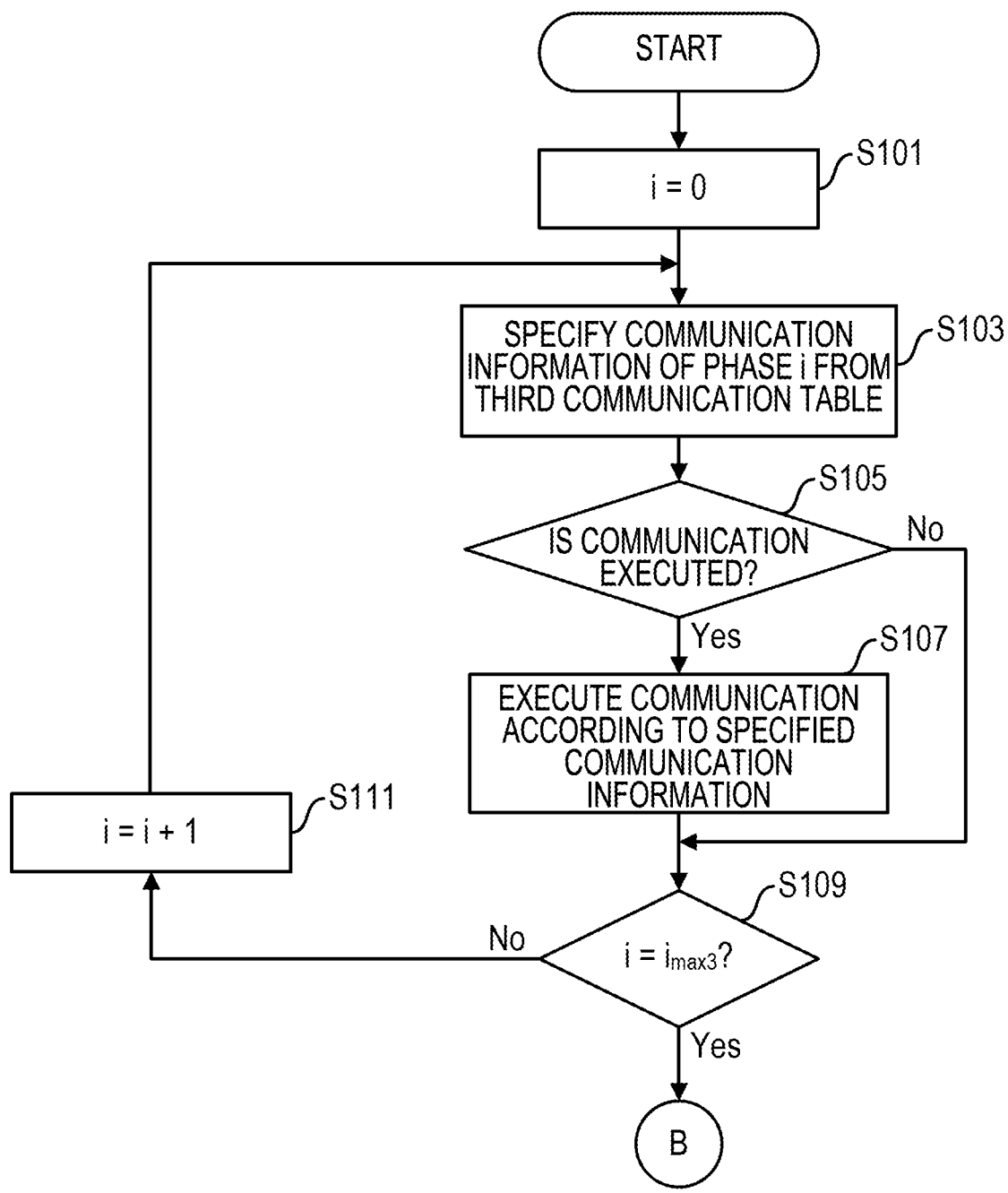
FIG. 33 is a diagram illustrating a processing flow of a processing executed by the server according to the second embodiment.

FIG. 33 is a diagram illustrating the processing flow of the processing executed by the server.

The third communication unit 1015 in the server sets the variable representing the phase number to 0 (FIG. 33: step S101).

The third communication unit 1015 specifies the communication information of phase "i" from the third communication table stored in the communication table storage unit 103 (step S103).

The third communication unit 1015 determines whether its own server (that is, the server that executes the processing) executes the communication in phase "i" (step S105). Whether the own server executes the communication in phase "i" is determined depending on whether the specified communication information includes the identification information of the own server.

When it is determined that the own server does not execute the communication in phase "i" (step S105: "No" route), the processing proceeds to step S109. Meanwhile, when it is determined that the own server executes the communication in phase "i" (step S105: "Yes" route), the third communication unit 1015 executes the communication according to the communication information specified at step S103 (step S107).

As described above, the communication performed according to the third communication table is the all-reduce communication between the servers which belong to the same column and are allocated with the same number, and each server executes the operation related to the all-reduce.

The third communication unit 1015 determines whether $i=i_{max3}$ is established (step S109). The symbol "$i_{max3}$" is the maximum value of the phase number of the communication performed according to the third communication table. When it is determined that $i=i_{max3}$ is not established (step S109: "No" route), the third communication unit 1015 increments "i" by 1 (step S111). Then, the processing proceeds to step S103. Further, the end of the phase is confirmed by the barrier synchronization.

Meanwhile, when it is determined that $i=i_{max3}$ is established (step S109: "Yes" route), the processing proceeds to step S113 of FIG. 34 via terminal B.

Figure 34:
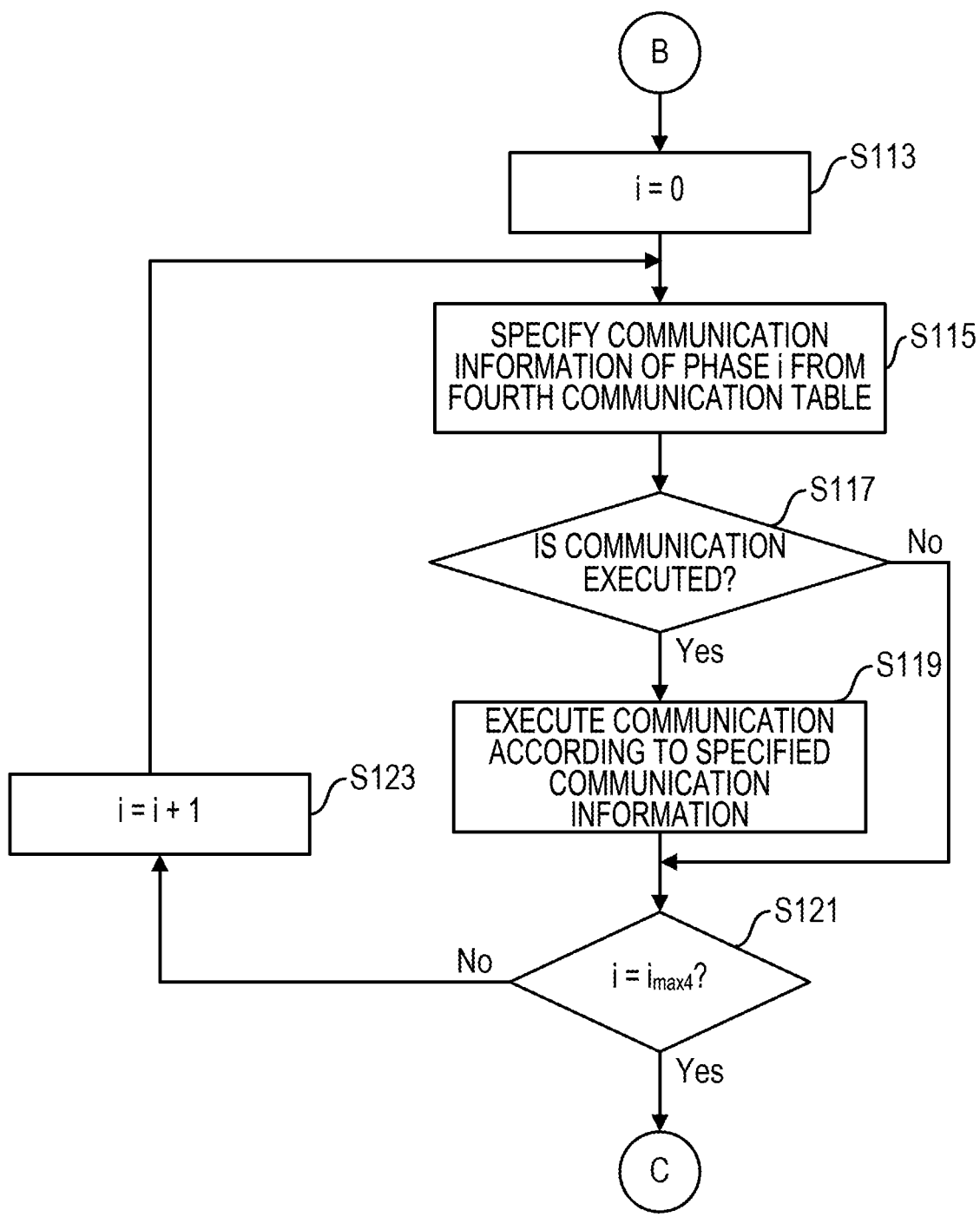
FIG. 34 is a diagram illustrating the processing flow of the processing executed by the server according to the second embodiment.

Referring to the description of FIG. 34, the fourth communication unit 1017 sets the variable representing the phase number to 0 (FIG. 34: step S113).

The fourth communication unit 1017 specifies the communication information of phase "i" from the fourth communication table stored in the communication table storage unit 103 (step S115).

The fourth communication unit 1017 determines whether its own server performs the communication in phase "i" (step S117). Whether the own server executes the communication in phase "i" is determined depending on whether the specified communication information includes the identification information of the own server.

When it is determined that the own server does not execute the communication in phase "i" (step S117: "No" route), the processing proceeds to step S121. Meanwhile, when it is determined that the own server executes the communication in phase "i" (step S117: "Yes" route), the fourth communication unit 1017 executes the communication according to the communication information specified at step S115 (step S119).

As described above, the communication performed according to the fourth communication table is the all-reduce communication between the servers under the control of the same leaf switch, and each server executes the operation related to the all-reduce.

The fourth communication unit 1017 determines whether $i=i_{max4}$ is established (step S121). The symbol "$i_{max4}$" is the maximum value of the phase number of the communication performed according to the fourth communication table. When it is determined that $i=i_{max4}$ i is not established (step S121: "No" route), the fourth communication unit 1017 increments "i" by 1 (step S123). Then, the processing proceeds to step S115. Further, the end of the phase is confirmed by the barrier synchronization.

Meanwhile, when it is determined that $i=i_{max4}$ i is established (step S121: "Yes" route), the processing proceeds to step S125 of FIG. 35 via terminal C.

Figure 35:
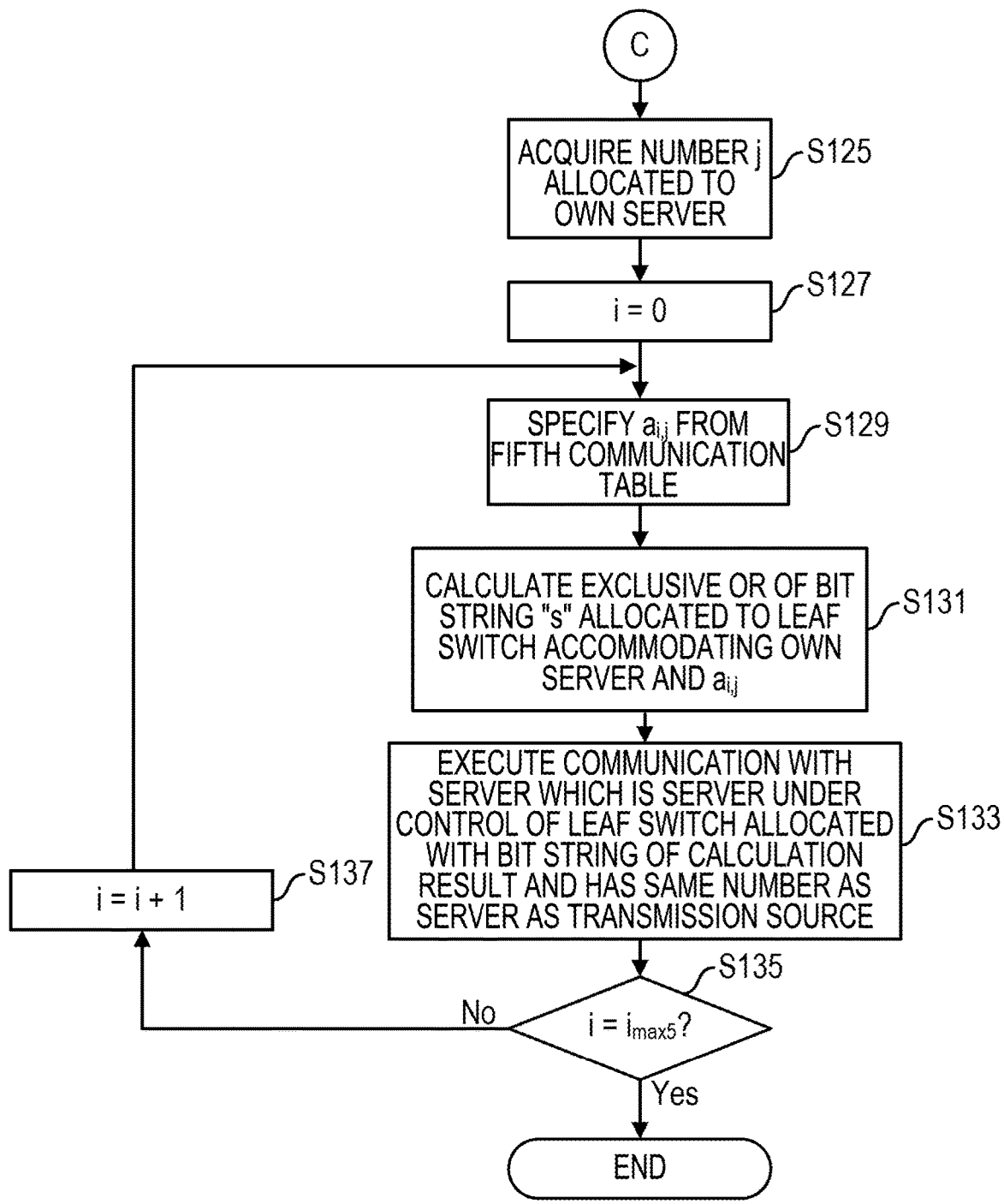
FIG. 35 is a diagram illustrating the processing flow of the processing executed by the server according to the second embodiment.

Referring to the description of FIG. 35, the fifth communication unit 1019 acquires the number "j" allocated to its own server from the memory device such as the memory (FIG. 35: step S125).

The fifth communication unit 1019 sets the variable "i" representing the phase number to 0 (step S127).

The fifth communication unit 1019 calls the bit string generation unit 105. As a result, the bit string generation unit 105 specifies the bit string $a_{i,j}$ from the fifth communication table stored in the communication table storage unit 103 (step S129).

The bit string generation unit 105 calculates the exclusive OR of the bit string "s" allocated to the leaf switch accommodating its own server and the bit string $a_{i,j}$ specified in step S129 (step S131). The bit string generation unit 105 transfers the bit string of the calculation result of step S131 to the fifth communication unit 1019.

The fifth communication unit 1019 is a server under the control of the leaf switch to which the bit string of the calculation result of step S131 is allocated, and executes the communication with a server to which the same number as that of the own server is allocated (step S133).

When the processing of step S133 ends, the fifth communication unit 1019 determines whether $i=i_{max5}$ is established (step S135). The symbol "$i_{max5}$" is the maximum value of the phase number of the communication performed according to the fifth communication table. When it is determined that $i=i_{max5}$ is not established (step S135: "No" route), the fifth communication unit 1019 increments "i" by 1 (step S137). Then, the processing proceeds to step S129. Further, the end of the phase is confirmed by the barrier synchronization.

Meanwhile, when it is determined that $i=i_{max5}$ is established (step S135: "Yes" route), the processing ends.

As described above, the servers which belong to the same column and are allocated with the same number have the same value by the communication according to the third communication table. Next, by the communication according to the fourth communication table, a plurality of servers under the control of each leaf switch has the same value. In addition, by the communication according to the fifth communication table, all of the servers in the multi-layer full mesh system 2000 have the same value. That is, in the multi-layer full mesh system 2000, the all-reduce is implemented.

As described above, in the present embodiment, the route contention does not occur in the process of the all-reduce communication.

In addition, according to the method of the embodiment, the all-reduce may be executed with a calculation amount of approximately O(log n) (n is the number of nodes).

Third Embodiment

In the first and second embodiments, k=2. However, even when k is a natural number equal to or more than 3, the all-reduce communication may be implemented without causing the occurrence of the route contention.

Figure 36:
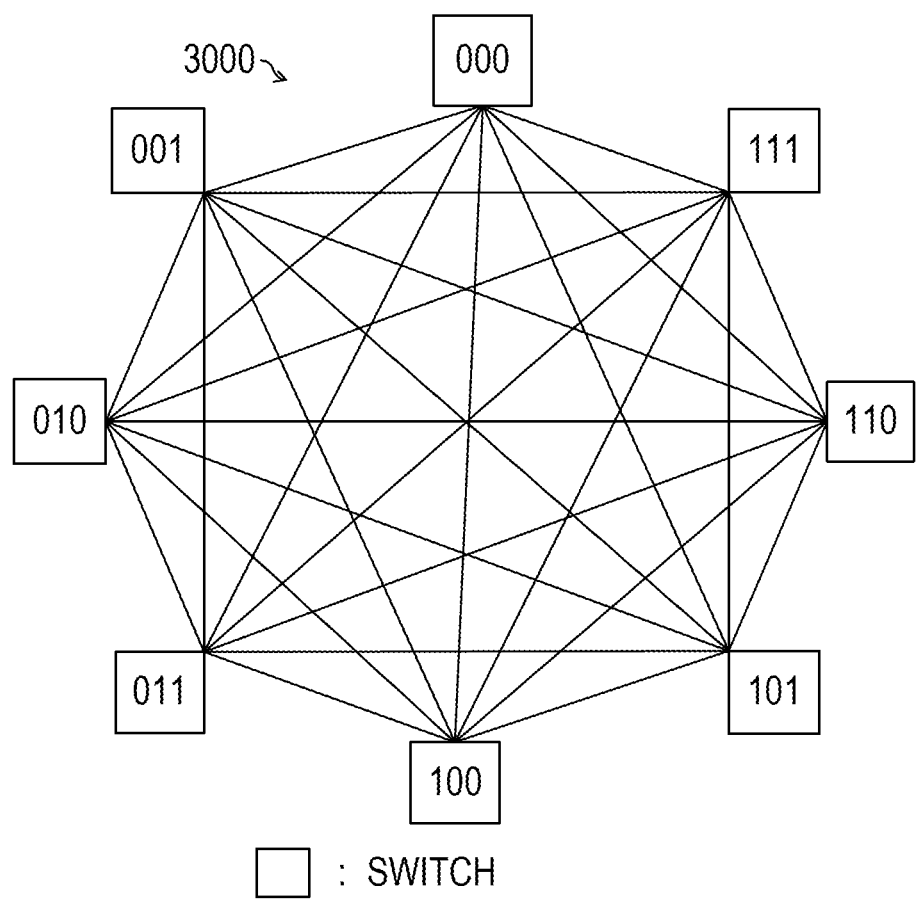
FIG. 36 is a diagram illustrating an example of a single-layer full mesh system according to a third embodiment.

As an example, FIG. 36 illustrates a single-layer full mesh system 3000 in the case of k=3. In FIG. 36, a three-digit bit string is allocated to each of eight nodes, and the eight switches are connected in a full mesh topology. Specifically, switches 000, 001, 010, 011, 100, 101, 110, and 111 are connected to each other in the full mesh topology. Although not illustrated in FIG. 36, 7 ($=2^3-1$) servers are connected to each switch.

FIG. 37 is a diagram illustrating an example of $a_{i,j}$ in the case of k=3. Since three bit strings in each column are linearly independent, it is possible to implement the all-reduce communication. In addition, since seven bit strings in each row are bit strings corresponding to the decimal numbers from 1 to 7, the route contention may be avoided.

Fourth Embodiment

By connecting a plurality of single-layer full mesh systems 3000 in the third embodiment, a multi-layer mesh system in a case where K is a natural number equal to or larger than 3 may be constructed. In this case, the all-reduce is executed substantially in the same manner as the method of the second embodiment.

Although the embodiments of the present disclosure have been described, the present disclosure is not limited thereto. For example, functional block configurations of the management apparatus 3 and the server described above may not match an actual program module configuration.

The configuration of each table described above is an example and may not be limited to the example. Further, even in the processing flow, the sequence of the processing may be changed as long as the processing result is not changed. Further, the processing may be executed in parallel.

Appendix 1. The following is the result of the generation of the bit string $a_{i,j}$ based on the generation cyclic scheme of the bit string $a_{i,j}$.

In the case of k=2, the generation result is {01, 11, 10}.
In the case of k=3, the generation result is {001, 011, 110, 010, 101, 100, 111}.
In the case of k=4, the generation result is {0110, 0111, 1001, 1000, 1010, 1100, 1011, 1111, 1110, 0011, 0100, 0001, 1101, 0010, 0101}.
In the case of k=5, the generation result is {00110, 00111, 01001, 01011, 10101, 01101, 01100, 01110, 10001, 10110, 01111, 10010, 10011, 11010, 10000, 11101, 11011, 10100, 10111, 11100, 11110, 11000, 00011, 01000, 00001, 11111, 00101, 01010, 00010, 00100, 11001}.
In the case of k=6, the generation result is {100001, 100010, 100100, 101000, 110000, 001011, 001001, 001010, 101110, 001101, 110011, 101101, 101100, 111000, 110110, 001100, 111011, 111100, 010101, 001110, 111111, 111110, 010000, 001111, 010010, 000111, 010011, 101001, 010001, 011100, 011000, 001000, 010110, 101010, 011011, 011001, 010111, 011111, 011110, 101011, 011010, 100000, 100011, 010100, 011101, 000110, 100110, 100111, 110001, 111101, 111010, 111001, 110100, 101111, 000101, 000100, 000010, 100101, 000011, 110010, 000001, 110101, 110111}.

2. Greedy Algorithm

The greedy algorithm used in the cyclic scheme is, for example, an algorithm illustrated in FIG. 38.

This concludes the appendix.

Figure 39:
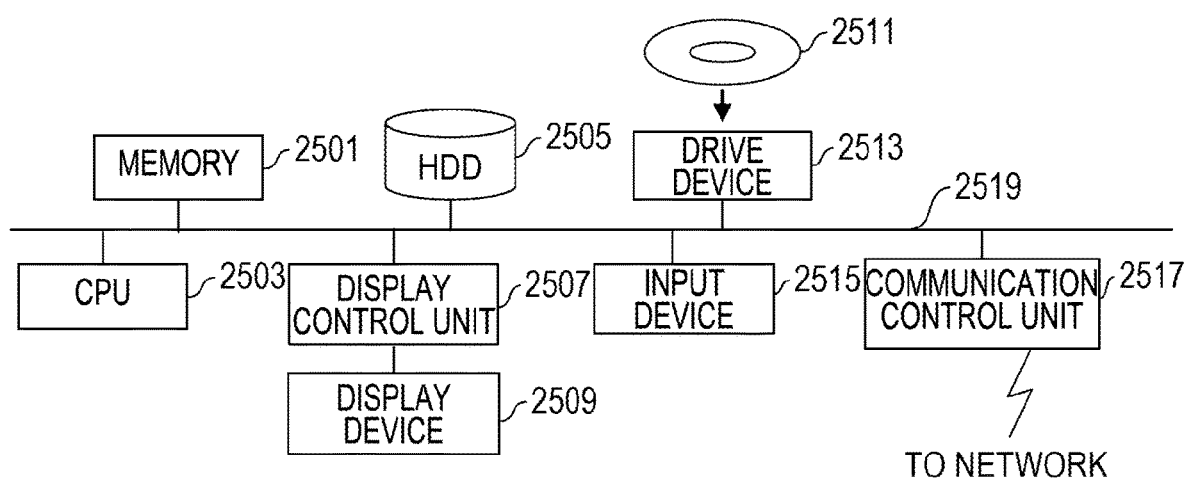
FIG. 39 is a hardware configuration diagram of a computer.

The management apparatus 3 and each server described above are computer apparatuses, and as illustrated in FIG. 39, the memory 2501, the CPU 2503, the HDD 2505, a display control unit 2507 connected to a display device 2509, a drive device 2513 for a removable disk 2511, an input device 2515, and a communication control unit 2517 for connection with a network are connected to each other through a bus 2519. An operating system (OS) and an application program for executing the processing in the embodiments are stored in the HDD 2505 and read from the HDD 2505 to the memory 2501 when executed by the CPU 2503. The CPU 2503 controls the display control unit 2507, the communication control unit 2517, and the drive device 2513 in accordance with processing contents of the application program to perform a predetermined operation. Further, data being processed is mainly stored in the memory 2501, but may be stored in the HDD 2505. In the embodiments of the present disclosure, the application program for performing the aforementioned processing is stored in the computer-readable removable disk 2511 and distributed and installed in the HDD 2505 from the drive device 2513. The application program may be installed in the HDD 2505 via the network such as the Internet or the like and the communication control unit 2517. Such a computer apparatus implements various functions as described above by organically cooperating with, for example, hardware such as the CPU 2503 and the memory 2501 and programs such as the OS and the application program.

Figure 40:
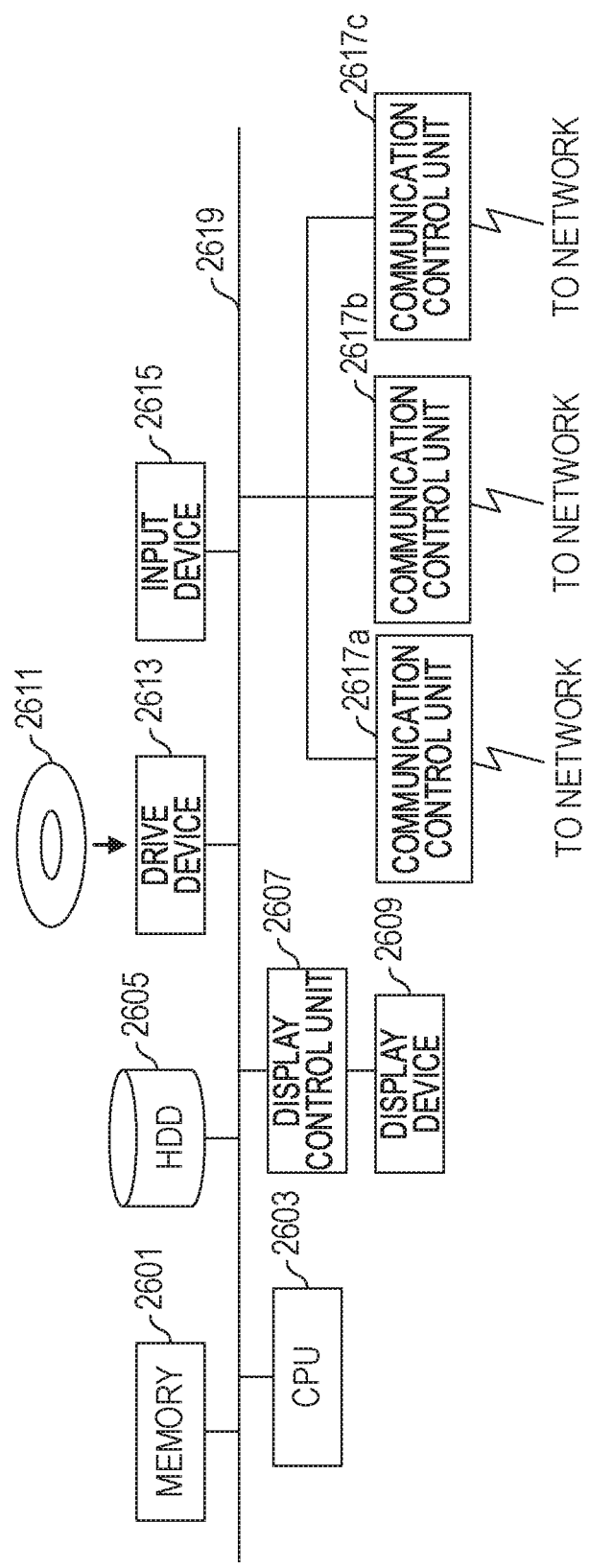
FIG. 40 is a hardware configuration diagram of a switch.

In the aforementioned leaf switch and spine switch, the memory 2601, the CPU 2603, the HDD 2605, the display control unit 2607 connected to the display device 2609, the drive device 2613 for the removable disk 2611, the input device 2615, and the communication control unit 2617 (2617a to 2617c in FIG. 40) for connection with the network may be configured to be connected to each other through the bus 2619 as illustrated in FIG. 40. Further, in some cases, the display control unit 2607, the display device 2609, the drive device 2613, and the input device 2615 may not be included. The operating system (OS) and the application program for executing the processing in the embodiments are stored in the HDD 2605 and read from the HDD 2605 to the memory 2601 when executed by the CPU 2603. As necessary, the CPU 2603 controls the display control unit 2607, the communication control unit 2617, and the drive device 2613 to perform required operations. Further, data input through any one of the communication control units 2617 is output through another communication control unit 2617. The CPU 2603 controls the communication control unit 2617 to appropriately switch an output destination. Further, the data being processed is stored in the memory 2601 and may be stored in the HDD 2605 if necessary. In the embodiments of the present disclosure, the application program for carrying out the processing described above is stored and distributed in the computer readable removable disk 2611 and is installed from the drive device 2613 into the HDD 2605. The application program may be installed in the HDD 2605 via the network such as the Internet and the communication control unit 2617. Such a computer apparatus implements various functions as described above by organically cooperating with hardware such as the CPU 2603 and the memory 2601, the OS, and a required application program.

The embodiments of the present disclosure described above are summarized as follows.

An information processing system according to a first aspect of the present disclosure includes (A) a plurality of switches (the switches 00 to 11 in the embodiment are an example of the plurality of switches) whose connection form is a full mesh and (B) a plurality of information processing apparatuses (the servers in the embodiment are an example of the plurality of information processing apparatuses) connected to any one of the plurality of switches. Each of a plurality of information processing apparatuses includes (b1) a generation unit (the bit string generation unit 105 of the embodiment is an example of the generation unit) that generates a second identifier by the exclusive OR of a first identifier which is an identifier of a switch connected to its own information processing apparatus and a number corresponding to a communication phase in a set of primary independent numbers allocated to the own information processing apparatus and (b2) a first communication unit (the second communication unit 1013 in the embodiment is an example of the first communication unit) that communicates with the information processing apparatus connected to the switch having the second identifier.

Each information processing apparatus uses the set of linearly independent numbers allocated to its own information processing apparatus, so that the occurrence of the route contention may be avoided when performing the all-reduce communication in the full mesh system.

The number of the plurality of switches may be $2^k$ (k is the natural number) and ($2^k-1$) information processing apparatuses may be connected to each of the plurality of switches.

In a case where the number of switches and the number of information processing apparatuses are not appropriate, it is not possible to perform the all-reduce communication without the route contention. However, in the information processing system described above, the all-reduce communication may be performed without the route contention.

The set of linearly independent numbers may be a set of k linearly independent k-digit bit strings, the identifier of each of the plurality of switches may be a k-digit bit string, a set of bit strings used by ($2^k-1$) information processing apparatuses connected to each of the plurality of switches in each communication phase may include bit strings corresponding to the decimal numbers of 1 to ($2^k-1$).

In addition, each of the plurality of information processing apparatuses may further include (b3) a second communication unit (the first communication unit 1011 in the embodiment is an example of the second communication unit) that communicates with another information processing apparatus connected to the switch having the first identifier. Further, the first communication unit may be (b21) an information processing apparatus connected to the switch having the second identifier and may transmit data to an information processing apparatus that does not receive data transmitted by an information processing apparatus other than its own information processing apparatus.

Each information processing apparatus may have the same calculation result.

An information processing system according to a second aspect of the present disclosure is an information processing system in which a plurality of full mesh systems each including a plurality of switches whose connection form is the full mesh and a plurality of information processing apparatuses connected to any one of the plurality of switches is connected to each other by a plurality of spine switches. In addition, each of the plurality of information processing apparatuses in each of the plurality of full mesh systems includes (C) a first communication unit (the third communication unit 1015 in the embodiment is an example of the first communication unit) that communicates with an information processing apparatus connected to a spine switch connected to a first leaf switch accommodating its own information processing apparatus and connected to a second leaf switch included in a full mesh system different from the full mesh system including the first leaf switch, (D) a second communication unit (the fourth communication unit 1017 in the embodiment is an example of the second communication unit) that communicates with another information processing apparatus accommodated in the first leaf switch, (E) a generation unit (the bit string generation unit 105 in the embodiment is an example of the generation unit) that generates a second identifier by exclusive OR of a first identifier which is an identifier of the first leaf switch and a number corresponding to a communication phase in a set of linearly independent numbers allocated to its own information processing apparatus, and (F) a third communication unit (the fifth communication unit 1019 in the embodiment is an example of the third communication unit) that communicates with an information processing apparatus accommodated in a leaf switch that has the second identifier and is included in the same full mesh system as its own information processing apparatus.

It is possible to avoid the occurrence of the route contention even when the all-reduce communication is performed in the multi-layer full mesh system.

An information processing method according to a third aspect of the present disclosure is executed by a first information processing apparatus among the plurality of information processing apparatuses in the information processing system including a plurality of switches whose connection form is the full mesh and a plurality of information processing apparatuses connected to any one of the plurality of switches. In addition, the information processing method includes (G) generating a second identifier by exclusive OR of a first identifier which is an identifier of a switch connected to the first information processing apparatus and a number corresponding to a communication phase in a set of linearly independent numbers allocated to the first information processing apparatus and (H) processing of performing communication with an information processing apparatus connected to a switch having the second identifier.

A program for causing a processor to execute the processing by the method described above may be created and the program is stored in a computer-readable memory medium or a memory device such as a flexible disk, a CD-ROM, a magneto-optical disk, a semiconductor memory, or a hard disk. In addition, an intermediate processing result is temporarily stored in a memory device such as a main memory.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. An information processing system, comprising:
   a plurality of switches connected to each other in a form of a full mesh; and
   a plurality of information processing apparatuses respectively connected to any one of the plurality of switches, a first information processing apparatus of the plurality of information processing apparatuses including a processor configured to:
   generate a second identifier by calculating an exclusive OR of a first identifier and a first number corresponding to a communication phase, the first identifier identifying a first switch connected to the first information processing apparatus, the first number being included in a set of linearly independent numbers allocated to the first information processing apparatus; and
   perform communication with a second information processing apparatus of the plurality of information processing apparatuses, the second information processing apparatus being connected to a second switch having the second identifier.

2. The information processing system according to claim 1, wherein
   a number of the plurality of switches is $2^k$ (k is a natural number), and
   ($2^k-1$) information processing apparatuses are connected to each of the plurality of switches.

3. The information processing system according to claim 2, wherein
   the set of linearly independent numbers is a set of k linearly independent k-digit bit strings,
   the identifier of each of the plurality of switches is a k-digit bit string, and
   a set of bit strings used, in each communication phase, by the ($2^k-1$) information processing apparatuses connected to each of the plurality of switches includes bit strings corresponding to decimal numbers of 1 to $(2^k-1)$.

4. The information processing system according to claim 1, wherein the processor is configured to:

perform communication with a third information processing apparatus of the plurality of information processing apparatuses, the third information processing apparatus being connected to the first switch; and transmit data to the second information processing apparatus, the second information processing apparatus not receiving data from an information processing apparatus other than the first information processing apparatus.

5. An information processing method, comprising:

generating, by a first computer of a plurality of computers, a second identifier by calculating an exclusive OR of a first identifier and a first number corresponding to a communication phase, the first identifier identifying a first switch connected to the first computer, the first number being included in a set of linearly independent numbers allocated to the first computer, the plurality of computers being respectively connected to any one of a plurality of switches connected to each other in a form of a full mesh; and performing communication with a second computer of the plurality of computers, the second computer being connected to a second switch having the second identifier.

6. An information processing system, comprising:

a plurality of spine switches; and a plurality of full mesh systems connected by the plurality of spine switches, each of the plurality of full mesh systems including a plurality of leaf switches connected to each other in a form of a full mesh and a plurality of information processing apparatuses respectively connected to any one of the plurality of leaf switches, a first information processing apparatus including a processor, the first information processing apparatus being connected to a first leaf switch and included in a first full mesh system, the first leaf switch being connected to a first spine switch, the processor being configured to:

perform communication with a second information processing apparatus connected to a second leaf switch included in a second full mesh system different from the first full mesh system, the second leaf switch being connected to the first spine switch;

perform communication with a third information processing apparatus connected to the first leaf switch;

generate a second identifier by calculating an exclusive OR of a first identifier and a first number corresponding to a communication phase, the first identifier identifying the first leaf switch, the first number being included in a set of linearly independent numbers allocated to the first information processing apparatus; and perform communication with a fourth information processing apparatus connected to a third leaf switch having the second identifier, the third leaf switch being included in the first full mesh system.

* * * * *